(12) United States Patent
Karnik et al.

(10) Patent No.: US 12,125,321 B2
(45) Date of Patent: *Oct. 22, 2024

(54) METHOD AND SYSTEM FOR VEHICLE SPEED ESTIMATION

(71) Applicant: CAMBRIDGE MOBILE TELEMATICS INC., Cambridge, MA (US)

(72) Inventors: Sushrut Karnik, Somerville, MA (US); Burak Erem, Needham, MA (US); Yuting Qi, Lexington, MA (US); Sanujit Sahoo, Boston, MA (US); Harrison Kitchen, Lexington, MA (US)

(73) Assignee: CAMBRIDGE MOBILE TELEMATICS INC., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/200,718

(22) Filed: May 23, 2023

(65) Prior Publication Data
US 2023/0298409 A1    Sep. 21, 2023

Related U.S. Application Data

(63) Continuation of application No. 16/994,232, filed on Aug. 14, 2020, now Pat. No. 11,699,306.
(Continued)

(51) Int. Cl.
*G07C 5/00*    (2006.01)
*G01P 15/00*    (2006.01)
(Continued)

(52) U.S. Cl.
CPC .............. *G07C 5/008* (2013.01); *G01P 15/08* (2013.01); *G01P 15/18* (2013.01); *G06N 3/04* (2013.01);
(Continued)

(58) Field of Classification Search
CPC ...... G07C 5/008; G07C 5/02; G07C 2205/02; G01P 15/08; G01P 15/18; G06N 3/04; G06N 3/08
(Continued)

(56) References Cited

U.S. PATENT DOCUMENTS 8,554,468 B1    10/2013  Bullock
9,842,438 B1    12/2017  Bradley et al.
(Continued)

FOREIGN PATENT DOCUMENTS

JP    2012208544 A    10/2012
WO    2017011811 A1    1/2017

OTHER PUBLICATIONS

U.S. Appl. No. 16/994,232, "Notice of Allowability", Jun. 5, 2023, 3 pages.
(Continued)

*Primary Examiner* — Mahmoud S Ismail
(74) *Attorney, Agent, or Firm* — Kilpatrick Townsend & Stockton LLP

(57) ABSTRACT

A method includes receiving, from a mobile device disposed within a vehicle, a set of sensor measurements collected from an accelerometer of the mobile device during a first time period and converting the set of sensor measurements into a frequency domain. The method also includes filtering the set of sensor measurements to eliminate high frequency sensor measurements and defining a set of contiguous windows based on a remaining sensor measurements in the set of sensor measurements. Each contiguous window of the set of contiguous windows represents a contiguous portion of the remaining sensor measurements. The method further includes generating, for each contiguous window of the set of contiguous windows, a set of features by resampling the remaining sensor measurements of the contiguous window
(Continued)

at one or more predefined frequencies and generating an estimated speed of the vehicle during the first time period using the set of features.

20 Claims, 27 Drawing Sheets

Related U.S. Application Data

(60) Provisional application No. 62/888,182, filed on Aug. 16, 2019.

(51) Int. Cl.
| | | |
|---|---|---|
| *G01P 15/08* | (2006.01) | |
| *G01P 15/18* | (2013.01) | |
| *G06N 3/04* | (2023.01) | |
| *G06N 3/08* | (2023.01) | |
| *G07C 5/02* | (2006.01) | |

(52) U.S. Cl.
CPC ............ *G06N 3/08* (2013.01); *G07C 5/02* (2013.01); *G07C 2205/02* (2013.01)

(58) Field of Classification Search
USPC .................................................. 701/32.2
See application file for complete search history.

(56) References Cited

U.S. PATENT DOCUMENTS

| | | | |
|---|---|---|---|
| 10,246,037 B1 * | 4/2019 | Shea | B60R 21/0132 |
| 2018/0126937 A1 | 5/2018 | De Silva et al. | |
| 2018/0336424 A1 * | 11/2018 | Jang | G06V 10/454 |
| 2019/0039545 A1 | 2/2019 | Kumar et al. | |
| 2019/0122048 A1 * | 4/2019 | Eaton | G06N 3/042 |
| 2020/0339056 A1 * | 10/2020 | Kriger | B60R 21/01516 |
| 2021/0172754 A1 * | 6/2021 | Nunkesser | G06N 20/00 |
| 2022/0108568 A1 * | 4/2022 | Bellas | H04M 1/72412 |

OTHER PUBLICATIONS

EP20191355.5, "Intention to Grant", Jul. 19, 2023, 9 pages.
U.S. Appl. No. 16/994,232, "Non-Final Office Action", Aug. 24, 2022, 31 pages.
U.S. Appl. No. 16/994,232, "Notice of Allowance", Feb. 23, 2023, 8 pages.
EP20191355.5, "Extended European Search Report", Jan. 21, 2021, 9 pages.
EP23214414.7, "Extended European Search Report", Apr. 3, 2024, 8 pages.
1 JP2020-137204, "Office Action", Jun. 5, 2024, 7 pages.

\* cited by examiner

METHOD AND SYSTEM FOR VEHICLE SPEED ESTIMATION

CROSS REFERENCE TO RELATED CASES

This application is a continuation of U.S. patent application Ser. No. 16/994,232, filed on Aug. 14, 2020, which claims priority to U.S. Provisional Patent Application No. 62/888,182, filed on Aug. 16, 2019, the disclosures of which are hereby incorporated by reference in their entireties for all purposes.

BACKGROUND

Unless otherwise indicated herein, the materials described in this section are not prior art to the claims in this application and are not admitted to be prior art by inclusion in this section.

Mobile devices typically include Global Positioning System (GPS) receivers as well as Inertial Measurement Units (IMU) that include sensors such as a three-axis accelerometer, a three-axis gyroscope, and a three-axis magnetometer for measuring angular rate, force, and magnetic field strength. Vehicle crashes can be detected with reasonable accuracy using a combination of GPS speed data and IMU measurements. However, a GPS receiver consumes a large amount of mobile device power and shortens operating time of the mobile device; therefore, reliance on GPS data is undesirable.

SUMMARY

Embodiments of the present invention generally relate to estimating vehicle speed, and more particularly, to predicting crash events using vehicle speed predictions.

According to various aspects there is provided methods for predicting crash events using vehicle speed predictions. Some methods include receiving from a mobile device disposed within a vehicle a set of sensor measurements from an accelerometer; converting the set of sensor measurements into a frequency domain; filtering with a bandpass filter the set of sensor measurements to eliminate high frequency sensor measurements from the set of sensor measurements; defining a set of contiguous windows based on a remaining sensor measurements in the set of sensor measurements, each contiguous window of the set of contiguous windows representing a contiguous portion of the remaining sensor measurements in the set of sensor measurements; generating for each contiguous window of the set of contiguous windows a set of features by resampling the sensor measurements of the contiguous window at one or more predefined frequencies; generating a speed prediction by executing a trained neural network using the set of features; generating a vehicle crash prediction using the speed prediction; and transmitting to a remote device the vehicle crash prediction.

Other methods include receiving from a mobile device disposed within a vehicle a set of sensor measurements from an accelerometer; generating a set of contiguous windows using the set of sensor measurements, wherein each contiguous window of the set of contiguous windows represent a subset of the set of sensor measurements; generating, for each contiguous windows of the set of contiguous windows a speed prediction by executing a trained neural network using the set of contiguous windows; receiving an indication that the vehicle is involved in a crash event; authenticating the crash event using the speed prediction; determining based on authenticating the crash event that the crash event did not occur; and purging in response to determining that the crash event did not occur the crash event from memory.

Another aspect of the present disclosure includes a system comprising one or more processors and a non-transitory, computer-readable medium storing instructions, which when executed by one or more processors, cause the one or more processors to perform the first method and/or the second method described above.

Another aspect of the present disclosure includes a non-transitory, computer-readable medium storing instructions, which when executed by one or more processors, cause one or more processors to perform the first method and/or the second method described above.

Numerous benefits are achieved by way of the various embodiments over conventional techniques. For example, the various embodiments provide methods and systems that can be used to circumvent excessive power consumption by GPS receivers operating for vehicle crash detection in mobile devices. In some embodiments, speed estimates for crash detection are obtained sensor measurements from an inertial measurement unit that consumes significantly less power from a mobile device than a GPS receiver. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
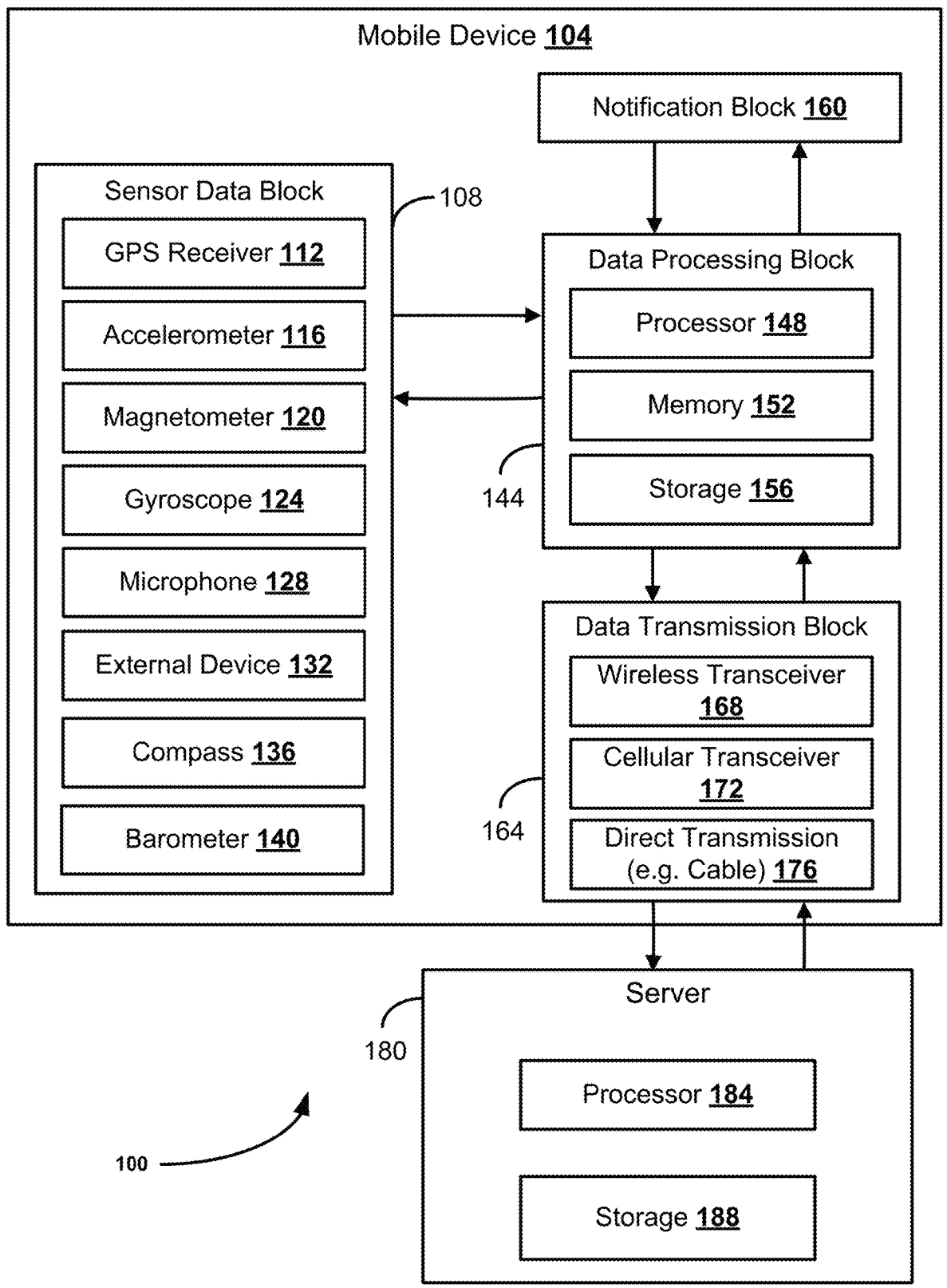
FIG. 1 is a block simplified diagram illustrating an example of a system for collecting driving data according to some aspects of the present disclosure.

FIG. 1 is a system diagram illustrating a system 100 for measuring device acceleration and detecting physical interaction according to some embodiments. System 100 includes a mobile device 104 which includes a plurality of processing, sensor, and communication resource components. Mobile device 104 may include a sensor data block 108, a data processing block 144, a data transmission block 164, and optionally a notification block 160. The sensor data block 108 includes data collection sensors as well as the data collected from sensors that is available to mobile device 104. This can include external devices connected via Bluetooth, USB cable, etc. The data processing block 144 may include storage 156 which may include data from the sensors of the sensor data block 108 processed by processor 122. This may include, but is not limited to, analyzing, characterizing, manipulating, smoothing, subsampling, filtering, reformatting, etc. Examples of mobile devices include, but are not limited to, smartphones, tablets, laptops, application specific integrated circuits (ASICs), and the like.

Data transmission block 164 may process communications (e.g., transmitted and received communications) such as the processed sensor data transmitted to an external computing device (e.g., server 180). The external computing device may also store and/or process the data obtained from sensor data block 108. Server 180 may include its own processor 184 and storage 188.

Notification block 160 may report the results of analysis of sensor data performed by the data processing block 144 to a user of the mobile device 104 via a display (not shown). For example, notification block 160 may display or otherwise present a warning communication to a user of the mobile device 104 upon determining that that the user may be a distracted driver. In some examples, the physical interaction determination may be a process executed by processor 148 of mobile device 104. In other examples, the physical interaction determination may be a process executed by processor 184, as described further herein with respect to FIG. 2.

Some embodiments are described using examples where driving data is collected using electronic device 104, and these examples are not limited to any particular electronic device. For example, electronic devices may include a variety of devices that be included within or connected to electronic device 104. Examples of electronic devices include, but is not limited to, devices with one or more of location determination systems such as global positioning system (GPS) receivers 112, accelerometers 116, magnetometers 120, gyroscopes 124, microphones 128, external (sensor) devices 132, compasses 136, barometers 140, communications capabilities, and the. Exemplary electronic devices include smart watches, fitness monitors, Bluetooth headsets, tablets, laptop computers, smart phones, music players, movement analysis devices, and the like.

One or more sensors of mobile device 104 (e.g., the sensors of sensor data block 108) may be operated to collect measurements to provide an indication as to physical interaction with the mobile device 104. In some examples, the measurements may be collected at time when the electronic device is likely to be with the driver when operating a vehicle, such as when the device is moving with a particular speed or when the device is located on a known road (e.g., a highway). The sensors used to collect data may be components of the mobile device 104, and use power resources available to mobile device 104 components (e.g., mobile device battery power and/or a data source external to mobile device 104).

In some examples, settings of a mobile device may be used to enable different functions described herein. For example, in Apple iOS, Android OS, and/or wearable device operating systems having certain settings enabled can enable certain functions of embodiments. In some examples, having location services enabled allows the collection of location information from the mobile device (e.g., collected by global positioning system (GPS) receiver 112), and enabling the background app refresh allows some embodiments to execute in the background, collecting and analyzing driving data even when the application is not executing. In some instances, location information may be determined by other sensors of the mobile device, such as by tracking movement of the mobile device (e.g., using an accelerometer), by receiving location information from an external source, radio triangulation (e.g., using cellular, Bluetooth, or Wi-Fi radios), by an IP address of the mobile device, or by other means. In some implementations, alerts are provided or surfaced using notification block 160 while the app is running in the background since the physical can be performed in the background.

Figure 2:
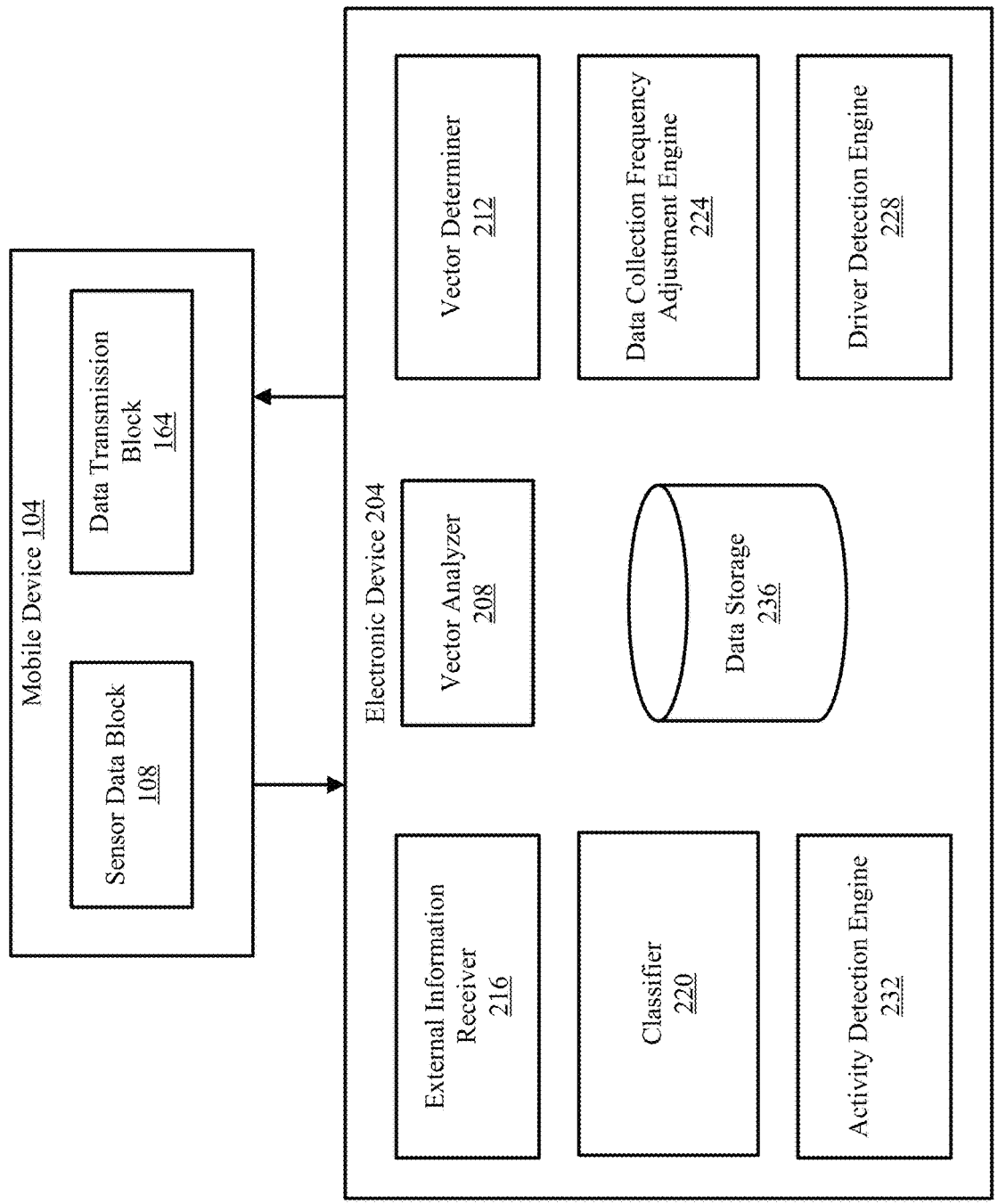
FIG. 2 is a simplified block diagram illustrating example of another system for collecting driving data according to some aspects of the present disclosure.

FIG. 2 is a simplified block diagram illustrating an example of another system 200 for collecting driving data according to some aspects of the present invention. System 200 may include electronic device 204, which may be incorporated within mobile device 104 (e.g., as specialized hardware or software) or may be a separate device (or execute on a separate device) that communicates with the mobile device 104. For instance, as a separate device electronic device 204 may be a mobile device (e.g., such as mobile device 104 of FIG. 1, a similar type of mobile device, a different type of mobile device, or the like), a server, a computing device such as desktop or laptop computer, a specialized processing device (e.g., such as one or more application specific integrated circuits, field programmable gate arrays, or the like), a distributed processing system (e.g., such a cloud environment or the like), a combination thereof (e.g., as a distributed process), or the like. In some embodiments, the electronic device 204 may provide functionality using components including, but not limited to: a vector analyzer 208, a vector determiner 212, an external information receiver 216, a classifier 220 (e.g., a machine learning model), a data collection frequency engine 224, a driver detection engine 228, and activity detection engine 232. Each component may include one or more processors (not shown) and memory (not shown). Instructions stored in the memory of a component may be executed by the one or more processors of the component provide the functionality of the component. Alternatively, one or more processors of electronic device 204 (not shown) may execute instructions stored in a central memory of electronic device 204 to provide the functionality of the components. The electronic device 204 may also include a data storage 236. In some instances, one or more of the components 208-232 operating on electronic device 204 may be stored memory 152 or storage 156 of mobile device 104, and/or executed by processor 148 of mobile device 104.

One or more of sensors of mobile device 104 (e.g., sensors of sensor data block 108) are used to measure characteristics of an environment in which the mobile device is positioned. For instance, the one or more sensors are used to collect characteristics of a vehicle while the mobile device is positioned in the vehicle and during a drive. In that instance, the one or more sensors may be operated while the mobile device is positioned proximate to a driver during a time interval that corresponds to when the driver is operating the vehicle. As used herein, the terms "drive" and "trip" refer to the operation of a vehicle over an interval of time. Measurements obtained from the one or more sensors may be analyzed to determine acceleration vectors for the vehicle, as well as different features of the drive. In some instances, external data (e.g., weather, traffic, vehicle information, driver information) can be retrieved and correlated with collected driving data.

In some embodiments, a display of a mobile device (such as mobile device 104) can show representations of driving data collected by the one or more sensors or generated by any of components 208-232. For instance, representations of driving data can be generated by transforming collected sensor data (e.g., driving data collected using sensor data block 108) into different results, including, but not limited to, estimates of an activity of a user of mobile device 104 (e.g., stationary, walking, running, driving), estimates of the occurrence of different driving events during a drive for which data was collected, a metric descriptive of the driving behavior of a driver during the drive, a metric descriptive of the overall driving behavior of a driver for all drives, a metric descriptive of a driver's behavior as related to the occurrence of certain events, and/or a combination of transformed driving data and geographic data.

In some instances, collected driving data can be analyzed to assign scores to a drive, multiple drives, a driver, and/or driving behavior based on different criteria. A scoring engine (not shown) may aggregate data collected by the one or more sensors and apply one or more rules to generate scores for the embodiments. Further disclosure regarding scoring can be found in U.S. patent application Ser. No. 15/615,579, entitled "SYSTEMS AND METHODS FOR SCORING DRIVING TRIPS" ("the '579 application"), filed Jun. 6, 2017, herein incorporated by reference in its entirety.

Sensor data (e.g., collected using the sensor data block 108) may be used to analyze movement of the mobile device to detect the occurrence of driving events. The sensor data may be aggregated by electronic device 204 and analyzed once a predetermined amount of the sensor data is received. For example, once the electronic device 204 aggregates 50 megabytes of sensor data, the electronic device 204 may initiate an analysis of the sensor data. In another example, the electronic device 204 may initiate an analysis of the sensor data once electronic device 204 receives sensor data collected over a predetermined interval (e.g., a half hour of sensor data, an hour of sensor data, etc.). In still yet another example, the electronic device 204 aggregates sensor data associated with a drive and analyzes the sensor data once all of the sensor data associated with the trip is received. Alternatively, mobile device 104 includes one or more of components 208-232 and provides analysis of sensor data in real time (e.g., as the one or more sensors obtain measurements).

A GPS receiver may provide time stamped location and speed data that can be used by various applications executing on the mobile device. The time stamped data can be used to accurately determine vehicle location and speed. A GPS receiver may detect a crash and to determine distance traveled by the vehicle. For instance, GPS receiver may detect a crash by detecting sudden changes in speed or location. However, since mobile devices operate with limited resources due power and processing constraints and due to the high power consumption of operating a GPS receiver, electronic device 204 may use the one or more other sensors of mobile device 104 to detect vehicle location and/or speed.

For instance, a mobile device positioned in a vehicle experiences mechanical vibrations related to the activity of the vehicle. These vibrations are measurable using a subset of the sensors in the sensor data block 108 of mobile device 104 referred to as an inertial measurement unit (IMU). The measurements of the mechanical vibration can occur at varying amplitudes and frequencies, which can be used to identify the vehicle activity or in some cases activity of the user. For example, some or all of the accelerometer, gyroscope, and magnetometer measurements may distinguish walking patterns of the user from driving patterns of the vehicle (e.g., vehicle speed of approximately 5 m/s).

The IMU may include any of the accelerometer 116, the gyroscope 124, and the magnetometer 120. The IMU and the sensors included within may be a separate unit from a GPS receiver. The accelerometer 112 may be a three-axis accelerometer operable to measure longitudinal and lateral acceleration as well as acceleration due to gravity. The gyroscope 116 and the magnetometer 114 may also be three-axis devices and may measure angular rotation and magnetic heading, respectively, in three dimensions. The IMU may combine the three-dimensional accelerometer data with the three-dimensional gyroscopic data to identify movement of the mobile device with six degrees of freedom (6 DOF) (e.g., translation and rotation).

In some instances, data obtained from the IMU can be filtered and used as input to train a classifier such as classifier 220, to predict vehicle speed. An example of such a classifier includes, but is not limited to, an xgboost classifier. The classifier may be trained using features extracted from training data of a large number of driving trips. The extracted training features may include statistical features of the driving data, for example, median, variance, and maximum values of the IMU signals (e.g., accelerometer, gyroscope, and magnetometer signals). In some instances, the orientation of the mobile device with respect to gravity may be determined and input to the classifier for training. Other statistical features may be used without departing from the scope of the present invention.

During a drive with a mobile device positioned in a vehicle, the IMU of the mobile device may be used to obtain movement measurements from any of the accelerometer, the gyroscope, and the magnetometer, and the movement measurements to generate an input for a classifier to predict vehicle speed. In some instances, the acceleration measurements used in the prediction of vehicle speed may be user acceleration measurements. User acceleration measurements may be acceleration measurements for which the gravity component of acceleration has been removed. In some instances, the acceleration measurements used in the prediction of vehicle speed may be raw acceleration measurements. Raw acceleration measurements may be acceleration measurements that include the gravity component.

The movement measurement signals from the IMU sensors may be sampled at a specified sampling rate to obtain digital signals. In some instances, a 9 Hz sampling rate may be used for the movement measurement signals. In other instances, a 30 Hz sampling rate may be used for the movement measurement signals. Other sampling rates, for example, 50 Hz or another sampling rate may be used. Higher sampling rates can provide improved speed estimation at the cost of increased resource consumption (e.g., processing and/or power resources). Electronic device 204 and/or mobile device 104 may modulate IMU sensor sampling in real time to optimize the volume of data collected (e.g., for accuracy of data analysis) and the resource consumption.

For instance, if the mobile device is connected to a reliable power source (e.g., such as the vehicle's power supply), the movement measurement signals may be sampled at a highest frequency (e.g., 50 Hz or a predetermined highest frequency). If the mobile device is not connected to a power source, the movement measurement signals may be sampled at a lower frequency (e.g., 30 Hz sampling or a predetermined medium frequency). If the power supply of the mobile device is below a threshold value (e.g., 25% of maximum), then the sampling of the movement measurement signals may be reduced to a lower frequency (e.g., 9 Hz or a predetermined low frequency) to conserve the remaining power of the mobile device. In some instances, the sampling rate of the movement measurement signals may be modified to improve the speed estimation. For instance, an accuracy metric may be used to indicate a likelihood that a given speed estimation is valid. If the accuracy metric does not exceed a threshold, the sampling rate of the movement measurement signals may be temporarily or permanently increased until the accuracy metric exceeds the threshold. The mobile device may modulate the sampling rate in real time based on the operating conditions (e.g., resource consumption) of the mobile device or the metric.

Filtered IMU signals, can distinguish driving, stopping, and user walking patterns. A bandpass filter (e.g., implemented in hardware or software), for example, an infinite impulse response (IIR) filter, may be used to filter the IMU signals to isolate frequencies indicative of various vehicle activities and to remove signal magnitude values exceeding a specified threshold. Portions of the signals having magnitude values exceeding the specified threshold may be excluded from further bandpass filtering. The digital bandpass filters can be designed to isolate the amount of vibration (i.e., frequencies) occurring within specific frequency ranges of interest. For example, the amount of vibrations may be separated into frequency ranges from 0.2 Hz to 1.1 Hz, from 1.1 Hz to 2.0 Hz, etc., depending on the sampling frequency, by bandpass filtering the signals.

Changes in lower frequency bands, for example up to approximately 1 Hz, may contain information about the vehicle stopping, while changes in higher frequency bands may correspond to the vehicle driving at higher speeds. The sources of the vibrations detected by the IMU sensors are complex interactions between engine vibrations resulting from speed changes, vibrations due to the vehicle interacting with the road surface at different speeds). A machine-learning model (e.g., the classifier) can learn these more complex interactions, which can be a combination of high and low frequencies, which correspond to each vehicle behavior.

In some instances, IMU sensor signals having large magnitudes may be disruptive to the vehicle speed prediction. In those instances, filtering may exclude the large magnitude signals. For example, accelerometer signal magnitude values exceeding a threshold value of about 10 m/s$^2$ or another threshold value, as well as any subsequent portions of the signal, may be excluded. The portions of the IMU signals up to, but not including, the signal magnitude values exceeding the threshold value may be bandpass filtered using the IIR filter.

The IIR filtering process may employ forward-backward filtering in which the portions of the IMU signals are filtered normally (i.e., forward filtering), and the forward filtered signals are "flipped" in time and filtered again with the IIR filter (i.e., backward filtering) producing a squared amplitude response. The IIR filters can better isolate the signals of interest and minimize or eliminate nonlinear phase distortion of the signals. The IIR filters are applied recursively, such that the result of the last step of the filter algorithm is applied to the next step. IIR filtering methods may be more computationally efficient than filtering methods that require computation of all intermediate numerical quantities that lead to the result (e.g., Fourier transforms). IIR filters are also advantageous because they can isolate frequency ranges of interest with greater signal amplitude attenuation outside of a range of interest. In some implementations, a finite impulse response (FIR) filter, rather than an IIR filter, may be used for bandpass filtering of the IMU signals.

The number of frequency bands used for the bandpass filtering may be determined by the desired granularity and the sampling frequency of the sensor data. For example, 14 passbands may be used in equally spaced 0.3 Hz frequency bands from 0.2 Hz to a Nyquist sampling frequency of 4.5 Hz for data obtained using a 9 Hz sampling, and 28 passbands may be used from 0.2 Hz to 15 Hz for data obtained using a 30 Hz data. More granular frequency bands may be used when the IMU signals are sampled at higher sampling frequencies. Selection of the number and width of the frequency bands may be determined based on the desired signal quality in each band and the granularity of the information. For example, too many frequency bands can result in degraded signal quality due to the narrow bandwidth, while too few frequency bands may result in loss of granularity of the captured information.

Features, for example statistical features, may be extracted from some or all of the filtered signals. The features used as inputs to classifier 220 can be summary statistics (e.g., median, variance, and maximum) over the various signals, covering different time spans. The features may be extracted from time windows of different lengths. In some implementations, each of the statistical features may be extracted from the IMU signals over a 5-second time window, a 10-second time window, and a 20-second time window. Each window may be centered at the time point under consideration. Over each of the windows, summary statistics such as the mean, median, variance, maximum, and minimum of the various band-passed versions of the IMU sensor signals (e.g., accelerometer, gyroscope) contained in these windows can be calculated.

The different length windows may provide levels of stability for the feature values, with longer window times producing more stable feature values. Other window lengths or a different number of windows may be used without departing from the scope of the invention. For example, in some implementations, a single window may be used. For a bandpass filtered accelerometer signal between 0.2 Hz to 1.1 Hz, nine features may be extracted, e.g., median, variance, and maximum, with each feature extracted over a 5-second time window, a 10-second time window, and a 20-second time window. The feature extraction produces a single list of values (e.g., a feature vector) for each time point under consideration.

The extracted features (e.g., the feature vectors) may be input to the classifier. The machine learning model (e.g., the classifier) can then make a speed prediction based on the feature vector inputs. The vehicle speed prediction by the classifier may be quantized, for example, in increments of 5 m/s or another increment. In some implementations, the orientation of the mobile device with respect to gravity may be determined and input to the classifier.

Activity detection engine 232 identifies an activity that corresponds to sensor measurements received from the one or more sensors of sensor data block 108. For instance, the activity detection engine 232 identifies: when mobile device 104 is stationary, with a user who is walking, with a user who is running, with a user who is riding bicycle, in a vehicle that is driving, in a vehicle that is flying, and the like. In some instances, activity detection engine 232 outputs a probability of the activity. In those instances, activity detection engine 232 may output more than one probability such as a 45% probability that the mobile device is walking, a 33% probability that mobile device is driving, and a 22% probability of some other activity. The probability may be expressed as an integer or real number, a percentage, a grade (such as a low, medium, or high), or in any way that represents the probability of a given activity.

Activity detection engine 232 may use the activity to detect drives from sensor data. For instance, activity detection engine 232 may analyze the data received from mobile device 104 and identify a first time when the activity indicates a high probability that mobile device 104 is in a car that is driving. Activity detection engine 232 may identify a second time after the first time in which there is a high probability another activity (e.g., stationary, walking). Activity detection engine 232 then defines a drive as occurring from the first time to the second time. Other components of electronic device 204 may then further analyze the sensor data received between the first time and the second time to identify driver behavior, driver score, crash detection, speed estimation, etc. In some instances, activity detection engine 232 or any of the operations described in connection with the activity detection engine 232 may be performed by an operating system of the mobile device to manage data collection by sensor data block 108.

In some instances, activity detection engine 232 may operate on mobile device 104 to control collection of measurements from sensor data block 108. Mobile device 104 may execute a data collection application that controls the operation of the one or more sensors of mobile device 104 (e.g., such as sampling rates and the like) and collects measurements from the one or more sensors. The data collection application can include one or more of the components 208-232. Since the mobile device operates with limited resources, the data collection application may be suspended or terminated by the user of the mobile device, due to inactivity of the data collection application, when the mobile device is at rest, or the like. Activity detection engine 232 may operate in a background process to detect if a drive is occurring. If a drive is occurring, activity detection engine 232 may cause the data collection application to be initiated and begin collection of sensor data associated with the drive.

In some instances, activity detection engine 232 may generate a geofence around mobile device 104, which when crossed, will cause activity detection engine 232 to execute the data collection application or return the data collection application to an active state from a suspended state. If mobile device 104 crosses the geofence, then activity detection engine 232 may cause the data collection application to be initiated. For instance, the geofence may surround a user's vehicle or residence such that when the geofence is crossed it is likely due to the user initiating a drive. The geofence may be generated after a period of inactivity such as when the mobile device has been at rest for a predetermined time interval. The geofence may be generated a predetermined distance from the mobile such that when the mobile crosses the geofence it is likely due to the beginning of a drive rather than through other activity such as walking. Activity detection engine 232 may use other mechanisms to determine whether activate the data collection application including, but not limited to, detecting a visit (e.g., that the mobile device is at a particular location), a notification, a time interval, one or more sensor measurements exceeding threshold, or the like.

Since the data collection application of the mobile device 104 cannot collect sensor measurements until it is executed (or returned to an actively executing state), some sensor measurements may missed. For example, the data collection application may miss those sensor measurements associated with the portion of the drive that occurred prior to crossing the geofence. As a result, the data collection application may not collect sensor measurements for the entire drive, thereby missing valuable information about the drive, driver behavior, potential vehicle collisions, etc. In some instances, the mobile device 104 may not detect that a geofence has been crossed at all, thereby never activating the data collection application during the drive. In those instances, the mobile device 104 may miss the drive such that the data collection application does not collect any sensor measurements associated with the missed drive. The data collection application may obtain some sensor measurements collected over the missed drive from other processes executing on mobile device 104.

For instance, an operating system of mobile device 104 may collect and cache some sensor measurements over a sliding window such as an immediately preceding time interval of a predetermined length. The sliding window may include the preceding, twenty-four hours, forty-eight hours, seventy-two hours, ninety-six hours, or any predetermined time interval. Applications of mobile device 104 may request and obtain sensor measurements for up to the length of the sliding window from the operating system.

The operating system may begin collecting and caching sensor measurements upon request by an application such as the data collection application and retained the cached sensor measurements for up to the length of the sliding window. At that point, the operating system discards the oldest sensor measurement each time a new sensor measurement is added. For instance, the operating system may cache up to the previous 72 hours of sensor measurements (e.g., 72 hours from a current time such as now), at which point, the oldest sensor measurements (e.g., anything older than 72 hours) may be discarded such that the cache retains those sensor measurement collected over immediately previous 72 hours. In some instances, the operating system may only allow an application to request collection and caching of sensor measurements for a particular time interval (e.g., that may be smaller than or equal to the length of the sliding window). The data collection application may not be able to request the operating system to cache sensor measurements over the entire sliding window if the particular time interval is less than the sliding window. Instead, the data collection application may generate a series of requests with each subsequent request being sent upon termination of the particular interval of the previous request. This enables the data collection application to request caching of sensor measurements by the operating system for the entire sliding window.

In the following example, the sliding window may be 72 hours in length and the predetermined time interval may be 12 hours. When the data collection application executes (or returns from suspension), the data collection application may generate a first request that the operating system collect and cache sensor measurements for the next 12 hours. In response, the operating system will begin collecting and caching sensor measurements. The data collection application may then perform any intended operations that were the reason for its execution (or return from suspension) or terminate (or return to a suspended state). At the termination of the 12-hour time interval, the data collection application may execute (or return from suspension) and generate a second request to the operating system for collection and caching of sensor data for another 12 hours. In some instances, the data collection application may be executed before the termination of the 12-hour time interval. In that instance, the application may generate the second request to the operating system for collection and caching of sensor data for a 12-hour time interval that begins at the time of the second request (rather than at the termination of the previous 12-hour time interval). The data collection application may also access the sensor measurements from the previous 12-hours (from the first request). This process may be repeated every 12 hours such that the operating system caches up to 72 hours of sensor measurements.

The data collection application may access the cached sensor measurements over the entire 72 hours (e.g., based on each 12-hour request combined) even though the data collection application may be limited to sending requests for data collection and caching over smaller time intervals (e.g., in this case 12 hours). If the data collection application sends a first request (at the zero-hour mark) for 12 hours of sensor measurements, when the data collection application executes (or returns from suspension) 12 hours later, the operating system will have collected and cached 12 hours of sensor measurements that the data collection application may access. When the data collection application sends a second request to the operating system (at the 12-hour mark) for another 12 hours of sensor measurement caching, the operating system continues to collect and cache sensor measurements for the next 12 hours. When the data collection application executes 12 hours later (e.g., now at the 24-hour mark), the data collection application may now access 24 hours of sensor data even though the data collection application may only request that the operating system collect and cache sensor measurements for the next 12 hours.

The data collection application may continue to make requests for collection and caching of sensor measurements even when the cache includes sensor measurements over the 72-hour time interval (e.g., the complete sliding window). Since the cache may only store sensor measurements over the sliding window (e.g., the preceding 72 hours), the oldest sensor measurements (e.g., sensor measurements older than 72 hours) may be discarded as new sensor measurements are stored in the cache. Sensor measurements may be continually discarded as new sensor measurements are continually cached over the next requested time interval (e.g., 12 hours). With back-to-back requests by the data collection application, the data collection application may cause the operating system to perpetually cache the preceding 72 hours of sensor measurements.

Applications of mobile device 104 including components 208-232 may request data collection by the operating system while applications of the mobile device (such as the data collection application) are suspended or not executing. The operating system may collect sensor measurements over a predetermined time interval. For instance, an application may request sensor measurements from the operating system for up to 12 hours after the application is suspended or terminated. When the application is executed again, the application may request access to the sensor measurements collected by the operating system while the application was suspended or terminated.

As previously described, activity detection engine 232 may obtain the sensor measurements that were collected by the operating system (or another application) of the mobile device and generate a probability of an activity associated with the mobile device. Alternatively, this may be performed by the operating system itself. For instance, the operating system may output a probability that mobile device 104 is stationary, walking, running, driving, flying, or the like. Activity detection engine 232 may use the activity data from the operating system to determine a time interval during which a drive was likely to have occurred while the data collection application was suspended or terminated (e.g., not executing). Activity detection engine 232 may then request the sensor data collected by the operating system over the time interval. The sensor data collected by the operating system may be added to any sensor data collected by the data collection application.

For example, activity detection engine 232 may detect that mobile device 104 crossed a geofence and initiate execution of a data collection application to begin collection of sensor measurements such as IMU sensors. The data collection application then requests sensor data from the operating system for a time interval prior to when the mobile device crossed the geofence. This enables the mobile device 104 to capture sensor measurements over the entire duration of the drive despite the application executing and beginning collecting of sensor measurements a few minutes into the drive.

In another example, when the data collection application is executed, the data collection application requests sensor data from the operating system of mobile device 104 over a time interval prior to execution of the data collection application. The data collection application identifies from the activity data a first-time interval during which the operating system determines with a high probability that a drive occurred. The data collection application then requests the sensor data collected by the operating of the mobile device 104 over the first-time interval. In some instances, there may be a delay between when the drive begins and the operating system detects that a drive activity is occurring. Similarly, there may be delay between when the drive ends and the operating system detects that the drive ended. To ensure that sensor data for the entire trip is collected, the data collection application may request the sensor data over a second (larger) time interval that begins prior to the first-time interval (e.g., one minute, five minutes, ten minutes, or the like before the first time interval begins) and ends after the first-time interval (e.g., one minute, five minutes, ten minutes, or the like after the first-time interval ends).

Figure 3:
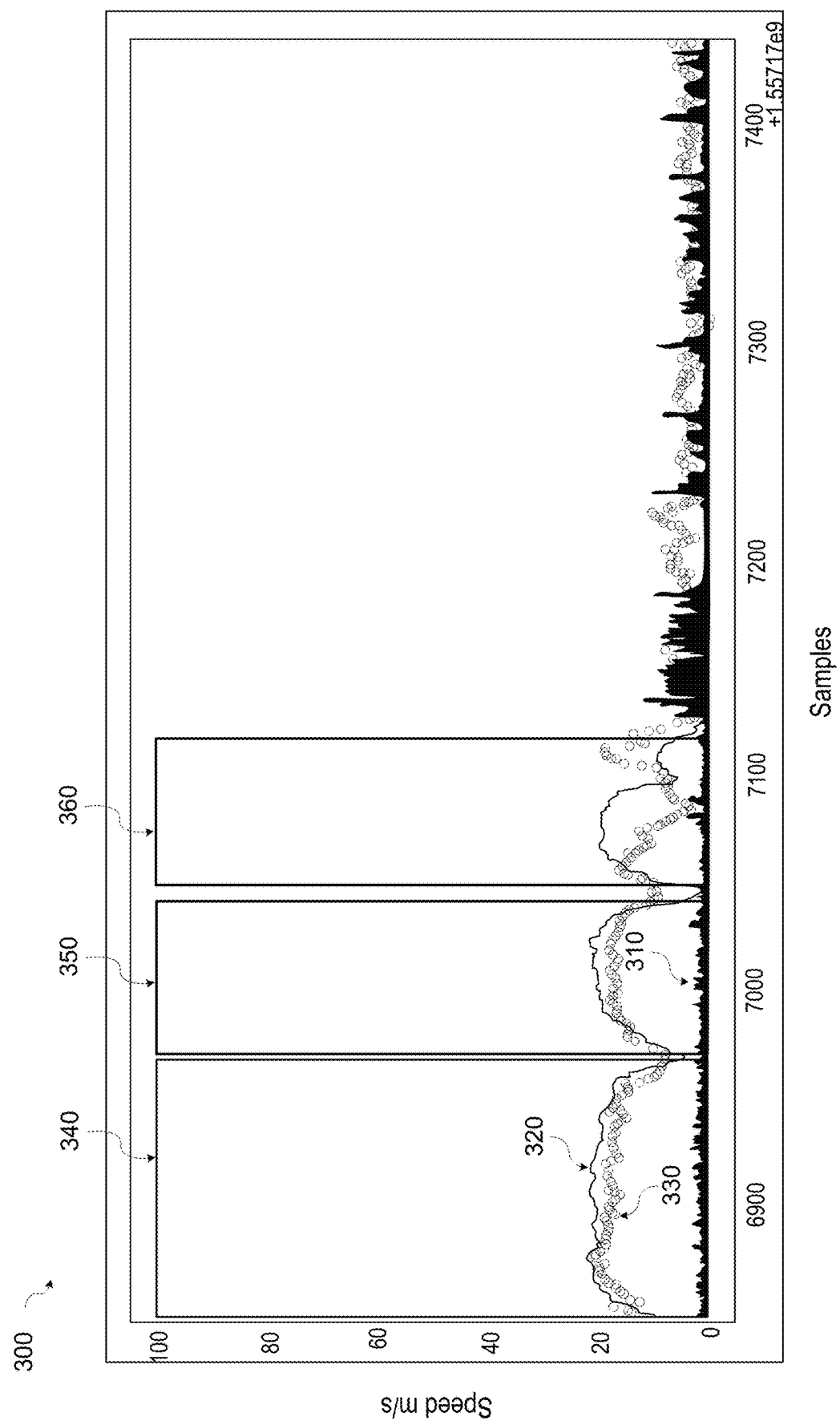
FIG. 3 is a plot illustrating an example of vehicle speed prediction by a classifier using features extracted from IMU signals sampled at 9 Hz according to various aspects of the present disclosure.

FIG. 3 is a plot 300 illustrating an example of vehicle speed prediction by a classifier using features extracted from IMU signals sampled at 9 Hz according to aspects of the present disclosure. FIG. 3 shows accelerometer data 310 using user acceleration (i.e., with the gravity component of acceleration removed) and GPS vehicle speed data 320 for a trip, as well as predicted vehicle speed 330 generated by the classifier. The IMU signals, in particular accelerometer and gyroscope (not shown) signals, were sampled at a sampling rate of 9 Hz, and forward-backward bandpass filtered with an IIR filter using 14 equally spaced frequency bands from 0.2 Hz to 4.5 Hz. The statistical feature (e.g., median, variance, and maximum values) were extracted from the filtered signals over three window sizes (20 seconds 340, 10 seconds 350, 5 seconds 360) and input to the classifier. As can be seen in FIG. 3, the predicted vehicle speed 330 generated by the classifier approximates the GPS vehicle speed data 320.

Figure 4:
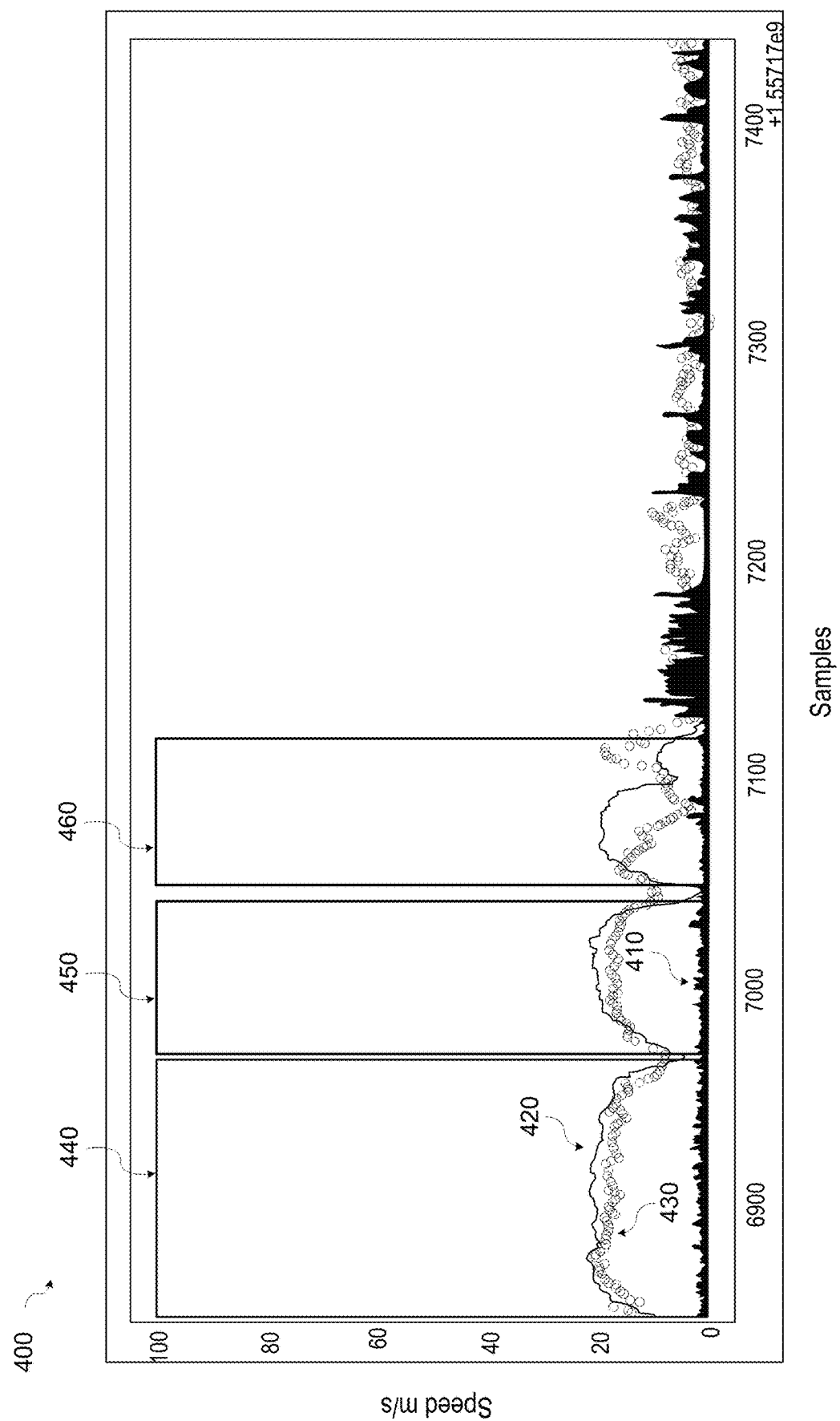
FIGS. 4 and 5 are plots illustrating examples of vehicle speed prediction by a classifier using features extracted from IMU signals sampled at 30 Hz according to aspects of the present disclosure.
Figure 5:
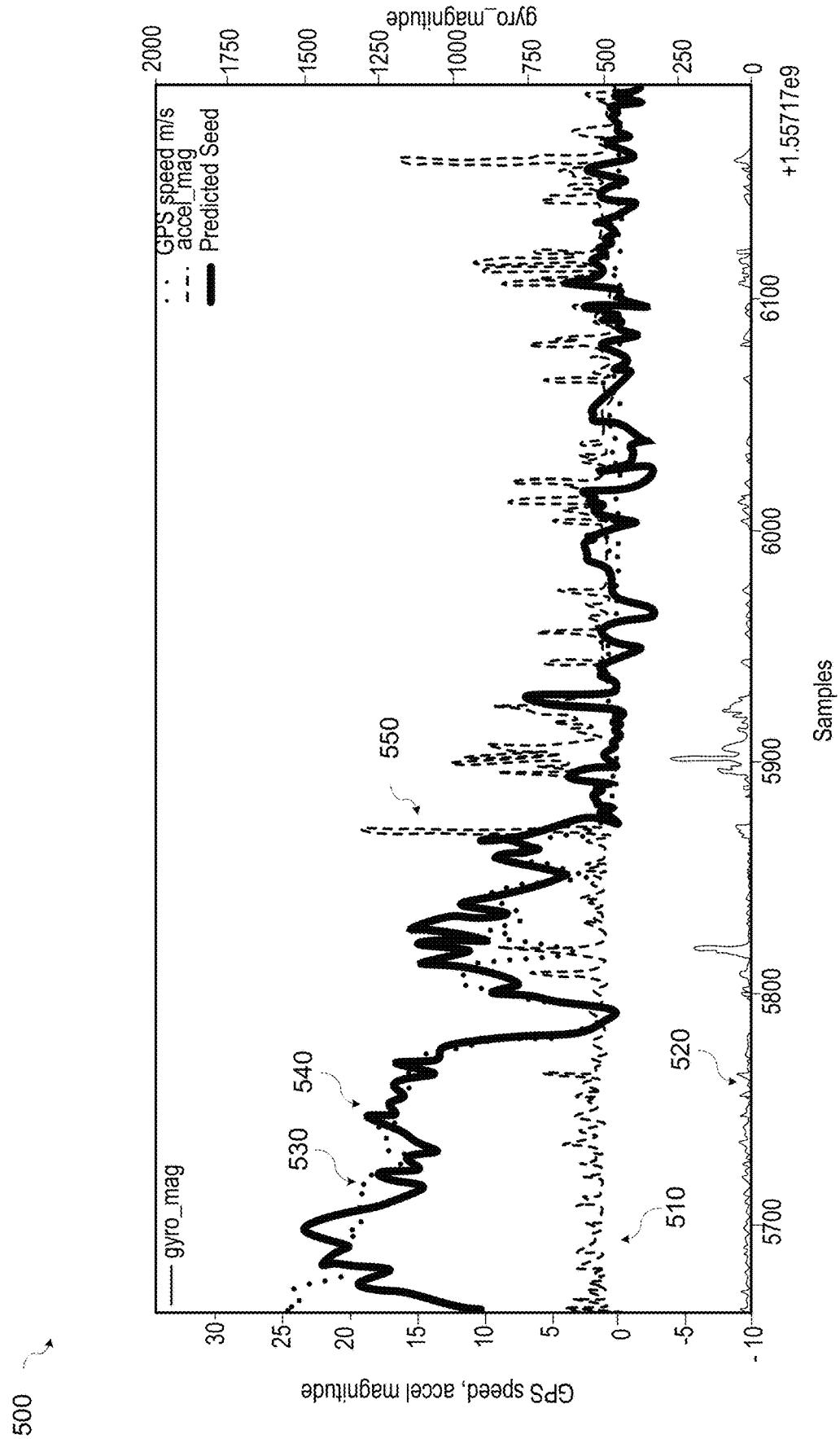

FIGS. 4 and 5 are plots 400, 500 illustrating examples of vehicle speed prediction by a classifier using features extracted from IMU signals sampled at 30 Hz according to aspects of the present disclosure. FIG. 4 shows accelerometer data 410 using user acceleration (i.e., with the gravity component of acceleration removed), gyroscope data 420, and GPS vehicle speed data 430 for a trip, as well as predicted vehicle speed 440 generated by the classifier. FIG. 5 similarly shows accelerometer data 510 using user acceleration (i.e., with the gravity component of acceleration removed), gyroscope data 520, and GPS vehicle speed data 530 for a trip, as well as predicted vehicle speed 540 generated by the classifier.

IMU signals, in particular accelerometer and gyroscope signals, were sampled at a sampling rate of 30 Hz, and forward-backward bandpass filtered with an IIR filter using 28 equally spaced frequency bands from 0.2 Hz to 14.8 Hz. The statistical features (e.g., median, variance, and maximum values) were extracted from the filtered signals over three window sizes (20 440 seconds, 10 seconds 450, 5 seconds 460) and input to the classifier. FIGS. 4 and 5 illustrate that a closer prediction of vehicle speed may be obtained when the IMU data is sampled at a higher sampling rate. Further, as can be seen in FIG. 4, the accelerometer signal 410 has a magnitude value exceeding a threshold value of about 10 m/s$^2$. Accordingly, filtering of the IMU sensor signals may be performed on the portions of the IMU signal up to, for example within two to five seconds or another time range, of the signal magnitude value exceeding the threshold value, but not including the signal magnitude value exceeding the threshold value or subsequent values of the signals.

Similarly, FIG. 5 illustrates the accelerometer signal 510 having a magnitude value 550 exceeding a threshold value of about 10 m/s$^2$. Thus, in FIGS. 4 and 5, only the portions of the IMU signals up to, but not including, the signal magnitude values exceeding the threshold value may be filtered using the IIR filter.

Figure 6:
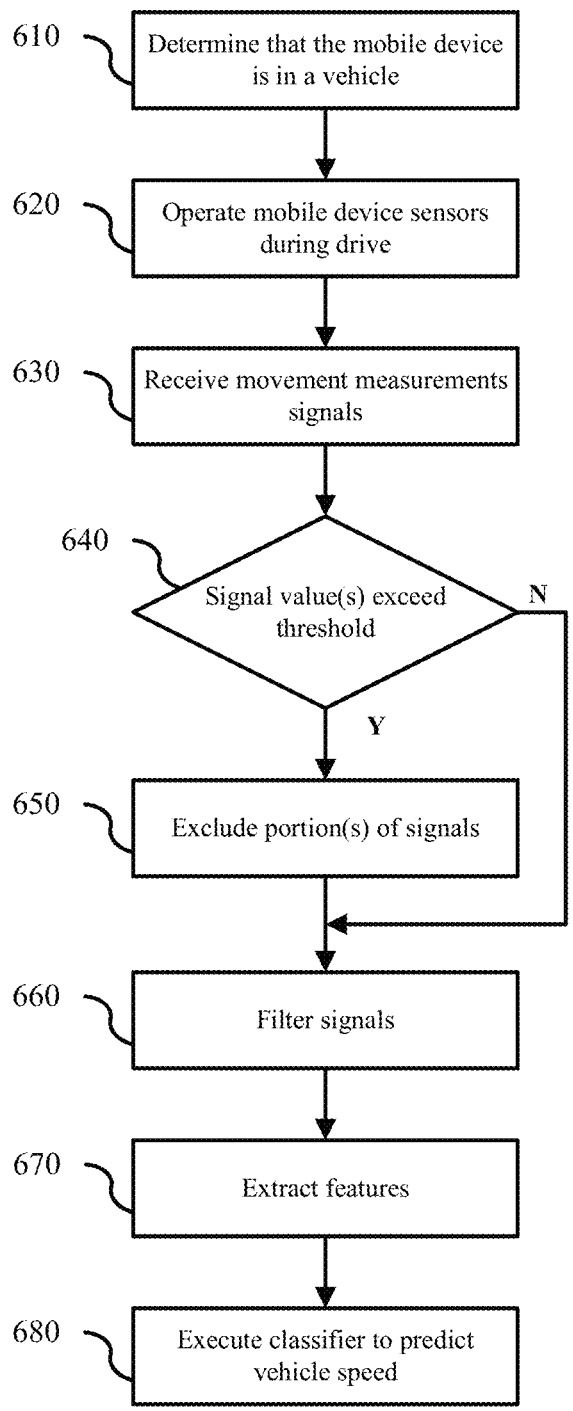
FIG. 6 is a flowchart illustrating an example of a process for estimating vehicle speed according to aspects of the present disclosure.

FIG. 6 is a flowchart illustrating an example of a method 600 for estimating vehicle speed according to aspects of the present disclosure. At block 610, it is determined that the mobile device is in a vehicle. For example, an accelerometer signal may be analyzed to determine a last signal pattern consistent with a user walking prior to a first accelerometer signal pattern consistent with movement of the vehicle. Further disclosure regarding determining that a user has entered the vehicle with the mobile device can be found in the incorporated '093.

At block 620, the sensors of the mobile device may be operated to obtain movement measurements. For example, the mobile device may include an IMU having, among other things, an accelerometer, a gyroscope, and a magnetometer. One or more of the IMU sensors (e.g., the accelerometer, the gyroscope, and the magnetometer) may be operated during a drive to obtain movement measurements while the GPS receiver is inactive.

At block 630, movement measurement signals may be received. The processor of the mobile device may receive the signals corresponding to the movement measurement from one or more of the accelerometer, the gyroscope, and the magnetometer of the IMU.

At block 640, it may be determined whether the value of one or more of the received signals exceeds a threshold value. In response to determining that one or more of the received signals exceeds a threshold value (640-Y), at block 650, it may be determined to exclude that portion of received signals from subsequent filtering. The processor of the mobile device may determine to exclude a portion of the received signals within a specified time period around the portion of the received signals exceeding the threshold value from subsequent filtering. The processor may cause a portion of the received signals up to the specified time to be filtered such that the portion of the one or more of the received signals that exceeds the threshold value is excluded from subsequent filtering. For example, the processor may determine to exclude portions of the received signals for 0.5 seconds or another time period before and after the time that the one or more of the received signals exceeds the threshold value. The time period may be determined at least in part on the sampling frequency, with a shorter time period being applied for a higher sampling frequency.

In some implementations, only the portion of the one or more signals preceding the time period may subsequently be filtered. In some implementations, both the portion of the one or more signals preceding the time period and the portion of the one or more signals following the time period may subsequently be filtered, effectively excluding the portion of the received signals exceeding the threshold value. The process may continue at block 660.

In response to determining that one or more of the received signals do not exceed a threshold value (640-N) at block 660 the signals may be filtered.

At block 660, the signals may be bandpass filtered with an IIR filter using a forward-backward filtering process. The forward-backward IIR filtering filters the IMU signals normally (i.e., forward filtering), and the forward filtered signals are then "flipped" in time and filtered again with the IIR filter (i.e., backward filtering) producing a squared amplitude response. The IIR filters can better isolate the signals of interest and minimize or eliminate nonlinear phase distortion of the signals. The IIR filters are applied recursively, meaning that the result of the last step of the filter algorithm is applied to the next step. IIR filters are also advantageous because they can isolate frequency ranges of interest with greater signal amplitude attenuation outside of a range of interest. The digital bandpass filters can be designed to isolate the amount of vibration occurring within specific frequency ranges of interest. In some implementations, a finite impulse response (FIR) filter, rather than an IIR filter, may be used for bandpass filtering of the IMU signals.

At block 670, features may be extracted from the filtered signals. Features, for example statistical features, may be extracted from some or all of the filtered signals. The features may be extracted from time windows of different lengths. In some implementations, each of the statistical features may be extracted from the IMU signals over a 5-second time window, a 10-second time window, and a 20-second time window. The different length windows may provide levels of stability for the feature values, with longer window times producing more stable feature values. Other window lengths or a different number of windows may be used without departing from the scope of the invention. For a bandpass filtered accelerometer signal between 0.2 Hz to 1.1 Hz, nine features may be extracted, e.g., median, variance, and maximum, with each feature extracted over a 5-second time window, a 10-second time window, and a 20-second time window.

At block 680, a classifier may be executed to predict vehicle speed. The features extracted from the filtered IMU signals may be input to the classifier, for example, an xgboost classifier. The extracted features maybe, for example, median, variance, and maximum values. Using the extracted features from the filtered IMU signals, the classifier may predict the speed of the vehicle. The vehicle speed prediction by the classifier may be quantized, for example, in increments of 5 m/s or another increment. In some implementations, the orientation of the mobile device with respect to gravity may also be determined and input to the classifier. Further disclosure regarding determining the orientation of the mobile device with respect to gravity can be found in the incorporated '099, '157, and '446, patents listed above.

In some implementations, the method of FIG. 6 may be used with only the accelerometer signal. For example, while the processor may receive signals from the various IMU sensors (e.g., the accelerometer, the gyroscope, and the magnetometer), only the accelerometer signals may be further processed for predicting vehicle speed. The movement measurement signals from the accelerometer may be sampled at a specified sampling rate to obtain digital signals. A digital bandpass filter, for example, an infinite impulse response (IIR) filter, may be used to filter the accelerometer signals to isolate frequencies indicative of various vehicle activities and to remove signal magnitude values exceeding a specified threshold. Portions of the accelerometer signals having magnitude values exceeding the specified threshold may be excluded from further bandpass filtering. The digital bandpass filters can be designed to isolate the amount of vibration (i.e., frequencies) occurring within specific frequency ranges of interest.

The IIR filtering process may employ forward-backward filtering in which the portions of the accelerometer signals are filtered normally (i.e., forward filtering), and the forward filtered signals are "flipped" in time and filtered again with the IIR filter (i.e., backward filtering) producing a squared amplitude response. Features, for example statistical features, may be extracted from the filtered accelerometer signals and provided as input to the classifier to predict vehicle speed.

In some implementations, the acceleration measurements used in the prediction of vehicle speed may be user acceleration measurements. User acceleration measurements are defined as acceleration measurements for which the gravity component of acceleration has been removed. In some implementations, the acceleration measurements used in the prediction of vehicle speed may be raw acceleration measurements. Raw acceleration measurements are defined as acceleration measurements that include the gravity component.

Figure 7:
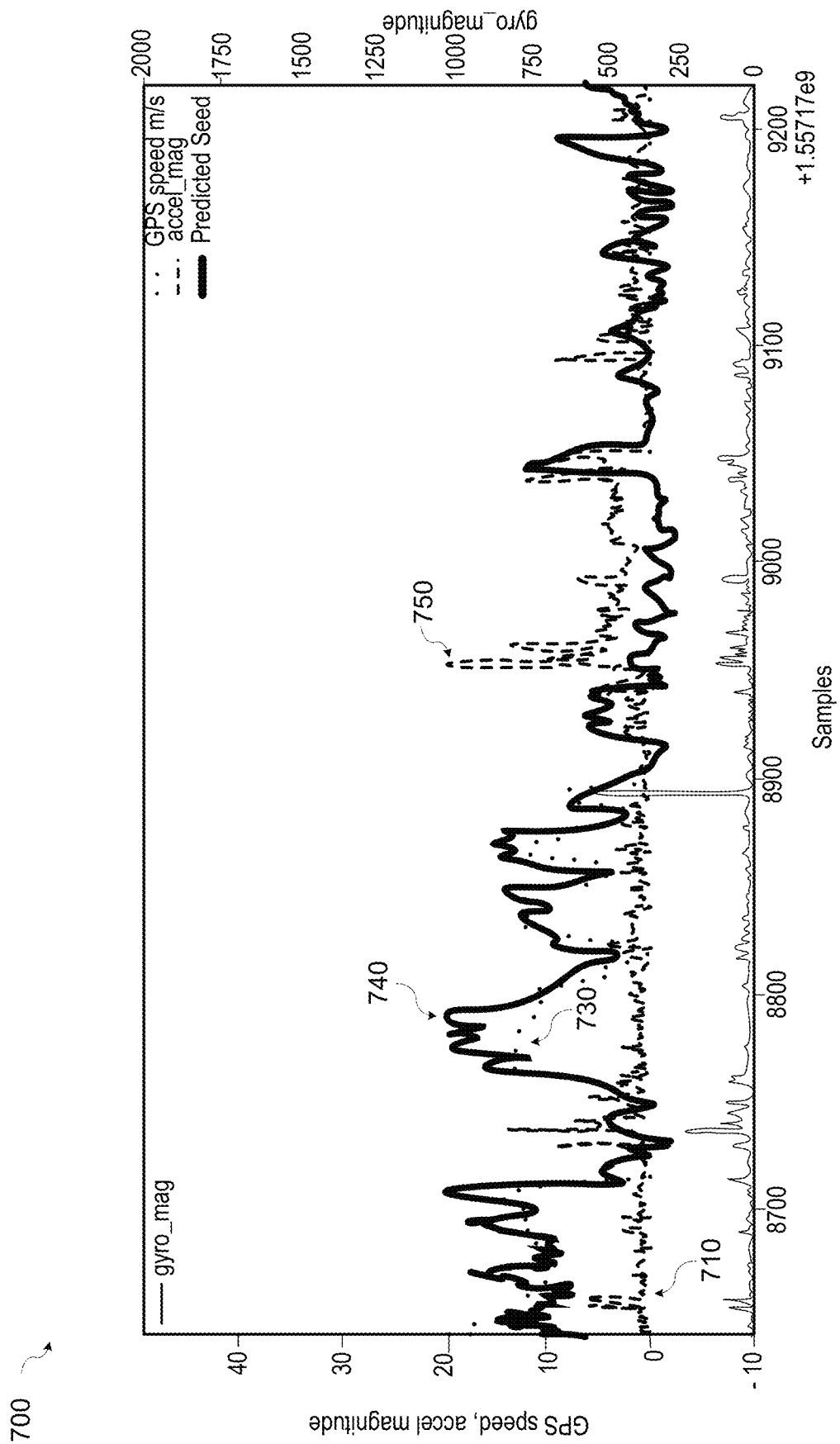
FIGS. 7 and 8 are plots illustrating examples of vehicle speed prediction by a classifier using features extracted from accelerometer signals sampled at 30 Hz according to aspects of the present disclosure.
Figure 8:
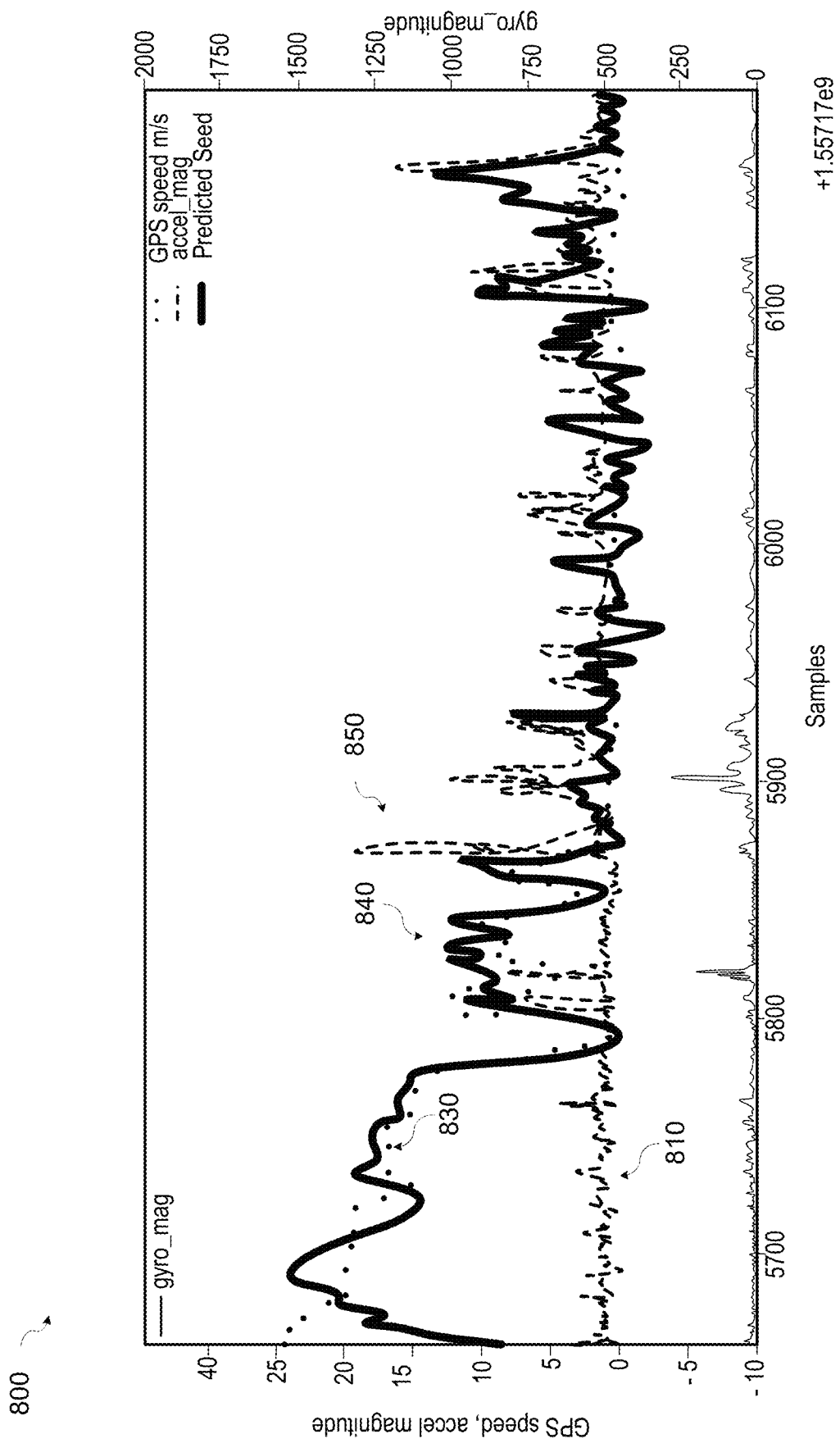

FIGS. 7 and 8 are plots 700, 800 illustrating examples of vehicle speed prediction by a classifier using features extracted from accelerometer signals sampled at 30 Hz according to aspects of the present disclosure. FIG. 7 shows accelerometer data 710 using user acceleration (i.e., with the gravity component of acceleration removed), and GPS vehicle speed data 730 for a trip, as well as predicted vehicle speed 740 generated by the classifier. Similarly, FIG. 8 shows accelerometer data 810 using user acceleration (i.e., with the gravity component of acceleration removed), and GPS vehicle speed data 830 for a trip, as well as predicted vehicle speed 840 generated by the classifier.

The accelerometer signals were sampled at a sampling rate of 30 Hz, and forward-backward bandpass filtered with an IIR filter. The statistical features (e.g., median, variance, and maximum values) were extracted from the filtered signals and input to the classifier. As can be FIG. 7, the accelerometer signal 710 has a magnitude value 750 exceeding a threshold value of about 10 m/s$^2$. Accordingly, filtering of the accelerometer signal may be performed on the portion of the accelerometer signal up to, for example within a fraction of a second of the signal magnitude value exceeding the threshold value, but not including the signal magnitude value exceeding the threshold value or subsequent values of the signals. Similarly, FIG. 8 illustrates the accelerometer signal 810 having a magnitude value 850 exceeding a threshold value of about 10 m/s$^2$. Thus, in FIGS. 7 and 8, only the portions of the accelerometer signals up to, but not including, the signal magnitude values exceeding the threshold value may be filtered using the IIR filter.

It should be appreciated that the specific operations illustrated in FIG. 6 provide a particular method for estimating vehicle speed according to an embodiment of the present invention. Other sequences of operations may also be performed according to alternative embodiments. For example, alternative embodiments may perform the operations outlined above in a different order. Moreover, the individual operations illustrated in FIG. 6 may include multiple sub-operations that may be performed in various sequences as appropriate to the individual operations. Furthermore, additional operations may be added or removed depending on the particular applications. One of ordinary skill in the art would recognize many variations, modifications, and alternatives.

The methods of FIG. 6 may be embodied on a non-transitory computer readable medium known to those of skill in the art, having stored therein a program including computer executable instructions for making a processor, computer, or other programmable device execute the operations of the methods.

Figure 9:
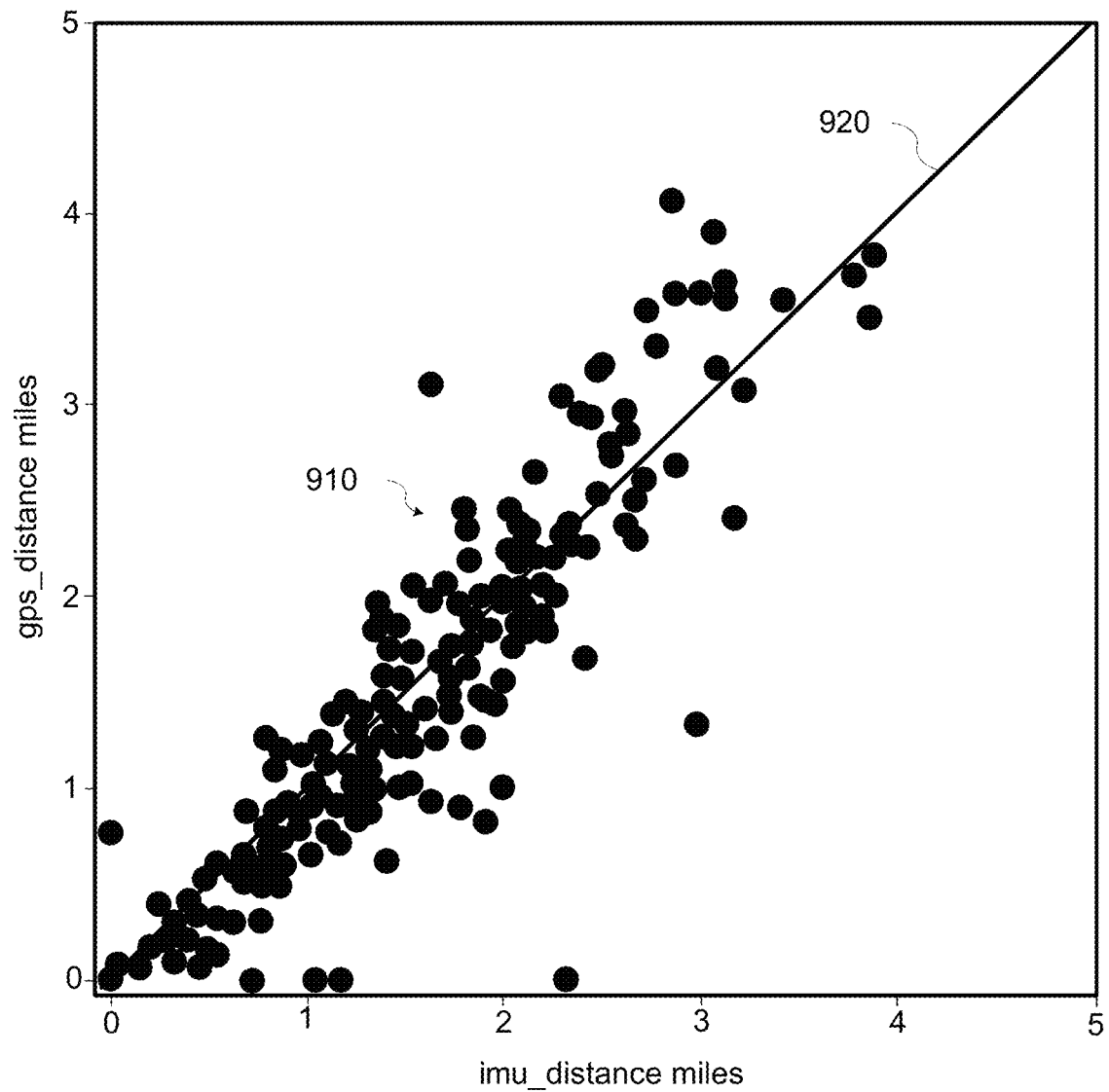
FIG. 9 is a cluster plot showing distance estimated by the classifier compared to distance measured by GPS according to aspects of the present disclosure.

In some implementations, the mobile device may be aligned to the vehicle to predict longitudinal acceleration by methods similar to the method of FIG. 6. Further disclosure regarding aligning a mobile device to a vehicle can be found in the incorporated '099 patent. In some implementations, other features, for example, the median, variance, maximum of the velocity change derived through integrating accelerometer data and the median, variance, maximum of the derivative of acceleration (also known as jerk), may be extracted from the bandpass filtered data and included as input to the classifier to predict vehicle speed as well as other vehicle movement characteristics. In some implementations, distance may be estimated by integrating the vehicle speed predicted by the classifier. FIG. 9 is a cluster plot 900 showing distance estimated by the classifier 910 compared to distance 920 measured by GPS according to aspects of the present disclosure.

According to some aspects of the present disclosure, vehicle mileage may be calculated from IMU sensor data collected in the background. Accelerometer data may be collected in the background during a trip in the vehicle. The accelerometer data may be down sampled to a frequency lower than the sampling frequency, for example 9 Hz or another frequency, and the magnitude of the down sampled signal calculated (e.g., by the processor of the mobile device).

The down sampled signal magnitudes may be segmented into fixed size time windows, and input to a machine learning model (e.g., a classifier) to predict the distance traveled for each segment. The predicted distance traveled for each segment may be combined to determine a predicted distance traveled for the trip.

In some implementations, the predicted distance traveled (i.e., mileage) may be accumulated for all vehicle trips during a specified time period, for example, one year or another time period, to determine the total mileage traveled during that time period.

Vehicle speed estimation based on IMU signals and acceleration only signals can have applications for areas such as driving data collection, transportation mode analysis, and crash prediction, as well as other areas.

In some embodiments, vehicle crashes may be predicted based only on signals generated by the IMU. Crash detection based only on the IMU signals provides an advantage over GPS-based crash detection at least in that the IMU consumes less mobile device power than a GPS receiver. For example, IMU data can be collected in the background any time the mobile device is operational. In addition, the sampling frequency for the IMU sensors may be controlled based on detected sensor activity. For example, a low sampling frequency used during steady state conditions may be increased when sudden changes acceleration or changes in direction are sensed. Obtaining GPS data, on the other hand, requires launching and running a GPS application on the mobile device which consumes additional power.

According to aspects of the present disclosure, information normally obtained from GPS data may be inferred from IMU data. For example, using the IMU data it may be determined whether a vehicle has been stopped for a specified period of time long enough to qualify as an event that a GPS measurement would identify as the vehicle being stopped for that amount of time.

Figure 10:
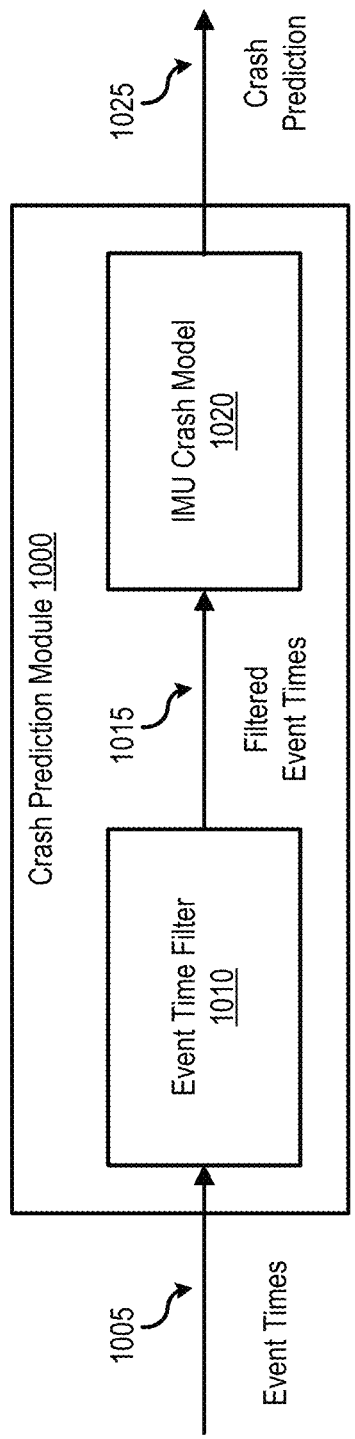
FIG. 10 is a block diagram illustrating an example of a crash prediction module according to aspects of the present disclosure.

FIG. 10 is a block diagram illustrating an example of a crash prediction module 1000 according to aspects of the present disclosure. Referring to FIG. 10, the crash prediction module 1000 may include an event time filter 1010 and an IMU crash model 1020. Both the event time filter 1010 and the IMU crash model 1020 may be machine learning models. The event time filter 1010 may be trained using IMU sensor data to identify event times that may have a higher likelihood (e.g., as determined from historical data) than neighboring times of indicating a crash.

Data from all the times recorded by the IMU sensors may be received by the crash prediction module 1000 as event times 1005. The event times 1005 may include IMU sensor data acquired during specified time windows. The event time filter 1010 may identify candidate event times. For example, the event time filter 1010 may identify candidate event times as time windows including accelerometer data exceeding a threshold magnitude (e.g., 10 m/s$^2$ or another magnitude). These candidate event times may have a higher likelihood than neighboring times of indicating a crash.

The event time filter 1010 may further filter the candidate event times by evaluating the IMU sensor data in time windows around the candidate event times to determine if various criteria are met. For example, using the IMU data, the event time filter 1010 can provide an indication equivalent to a GPS indication of vehicle speed going above a specified speed (e.g., 5 m/s or another speed) for a specified amount of time (e.g., 2 minutes or another time). As another example, the event time filter 1010 can provide an indication equivalent to a GPS indication that the vehicle traveled a specified distance (e.g., 250 meters or another distance) in a specified time (e.g., three minutes or another time). Other indications equivalent to GPS indications may be provided without departing from the scope of the present disclosure. Candidate event times and associated data that do meet the specified criteria can be filtered out by the event time filter 1010. Removing candidate event times unlikely to be crash indications can improve results (e.g., reduce false positives) of the IMU crash model.

The event time filter 1010 may output filtered event times 1015 that meet the specified criteria as input to the IMU crash model 1020. Using the filtered event times 1015, the IMU crash model 1020 may generate predictions 1025 of whether the vehicle was involved in a crash.

FIGS. 11A-11D are plots illustrating examples of crash prediction results according to aspects of the present disclosure. In FIGS. 11A-11D, the horizontal axis indicates false positive predictions per 12,000 miles driven, and the vertical axis indicates the fraction of crashes that can be detected as a function of the false positive predictions. In the U.S., 12,000 miles is the average annual mileage driven; thus, the plots in FIGS. 11A-11D may also be viewed as indicating the fraction of crashes that can be detected as a function of the false positive predictions per year (e.g., the number of false predictions that would be made for one driver-year).

In FIGS. 11A-11D, the plots 1110A-1110D represent crash prediction results generated by the IMU crash model 1020 without event times being filtered by the event time filter 1010. In other words, all the event times generated by the IMU are used as input to the IMU crash model 1020. The plots 1120A-1120D represent crash prediction results generated by the IMU crash model 1020 with the event time filter 1010 having exact knowledge of which candidate event times should be filtered out. The filtered event times fed to IMU crash model 1020 are based on GPS data known to indicate event times related to crash events. Thus, the plots 1120A-1120D indicate predictions by the IMU crash model 1020 based only on event times known to be associated with crashes, resulting in the best possible crash predictions.

The plots 1130A-1130D represent crash prediction results generated by the IMU crash model 1020 with the event time filter 1010 filtering the event times recorded by the IMU sensors and providing the filtered event times to the IMU crash model 1020. For FIGS. 11A and 11B, the candidate event time threshold for plots 1130A and 1130B was set at an acceleration spike of greater than 10 m/s$^2$. For FIGS. 11C and 11D, the candidate event time threshold for plots 1130C and 1130D was set as an acceleration spike of greater than 5 m/s$^2$.

Figure 11A:
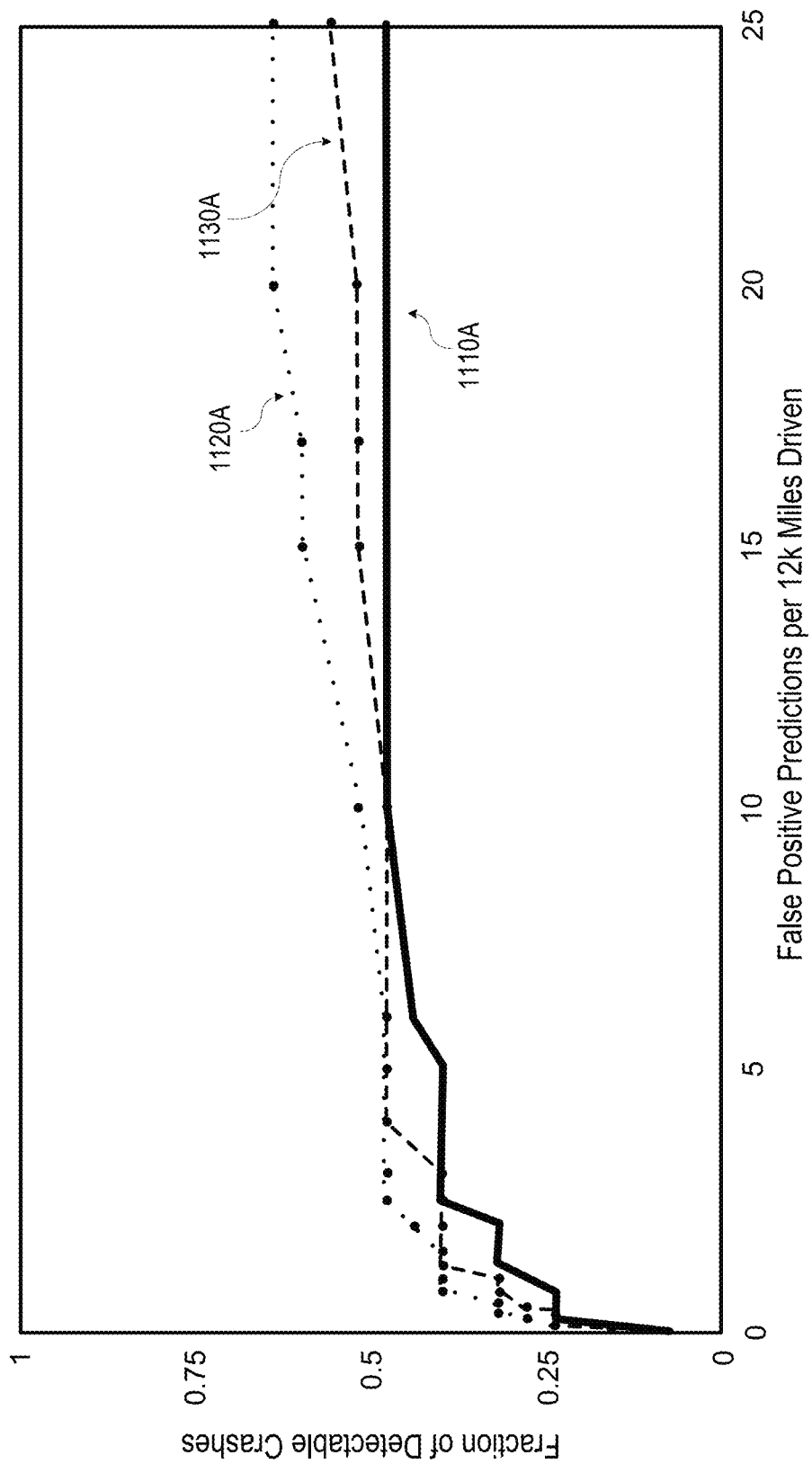
FIGS. 11A-11D are plots illustrating examples of crash prediction results according to aspects of the present disclosure.
Figure 11B:
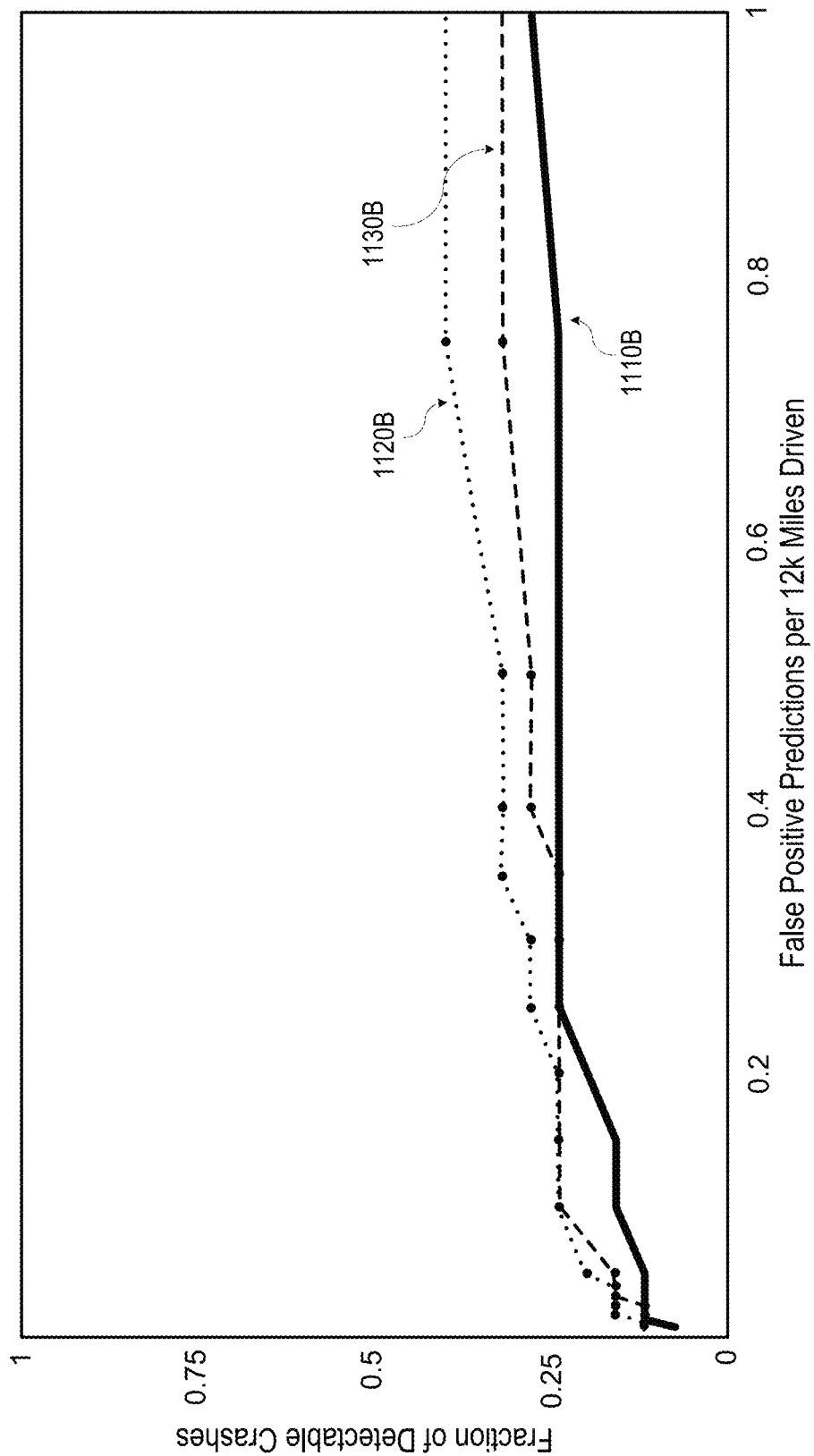
Figure 11C:
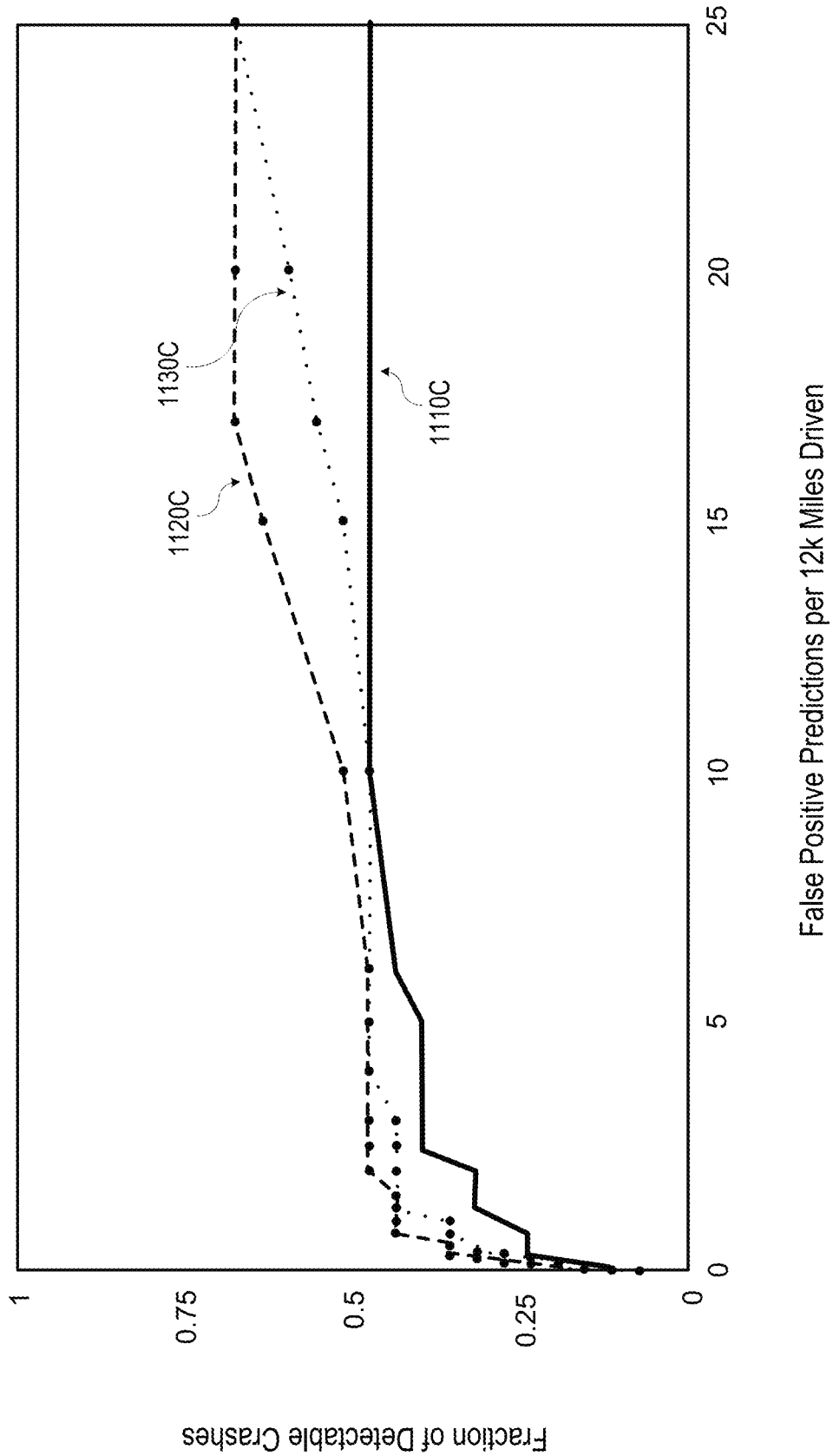
Figure 11D:
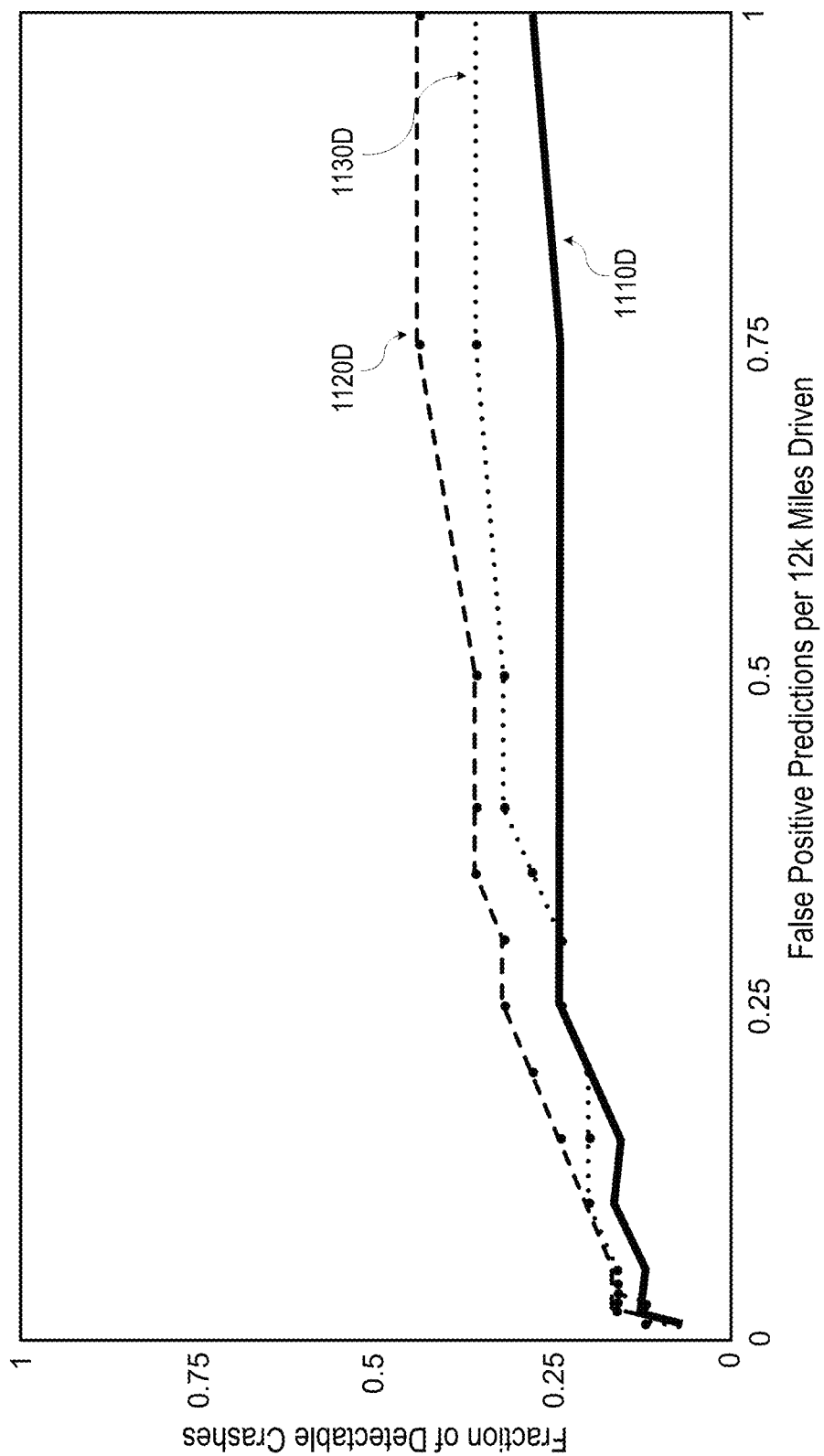

FIGS. 11A-11D illustrate that the effect of including the event time filter 1010 to filter the event times input to the IMU crash model 1020 is to increase the crash prediction accuracy of the IMU crash model 1020. As shown by the plots 1130A-1130D, including the event time filter 1010 moves the crash prediction accuracy of the IMU crash model 1020 alone (e.g., the plots 1110A-1110D) closer to the best possible crash prediction accuracy (i.e., the plots 1120A-1120D). Note that the expanded x-axis scales in FIGS. 11B and 11D illustrate false positive predictions per 12,000 miles driven is much less than one and approaching the best possible crash predictions (i.e., the plots 1120A-1120D) when the event time filter 1010 is used to filter the event times (i.e., the plots 1130A-1130D).

Figure 12:
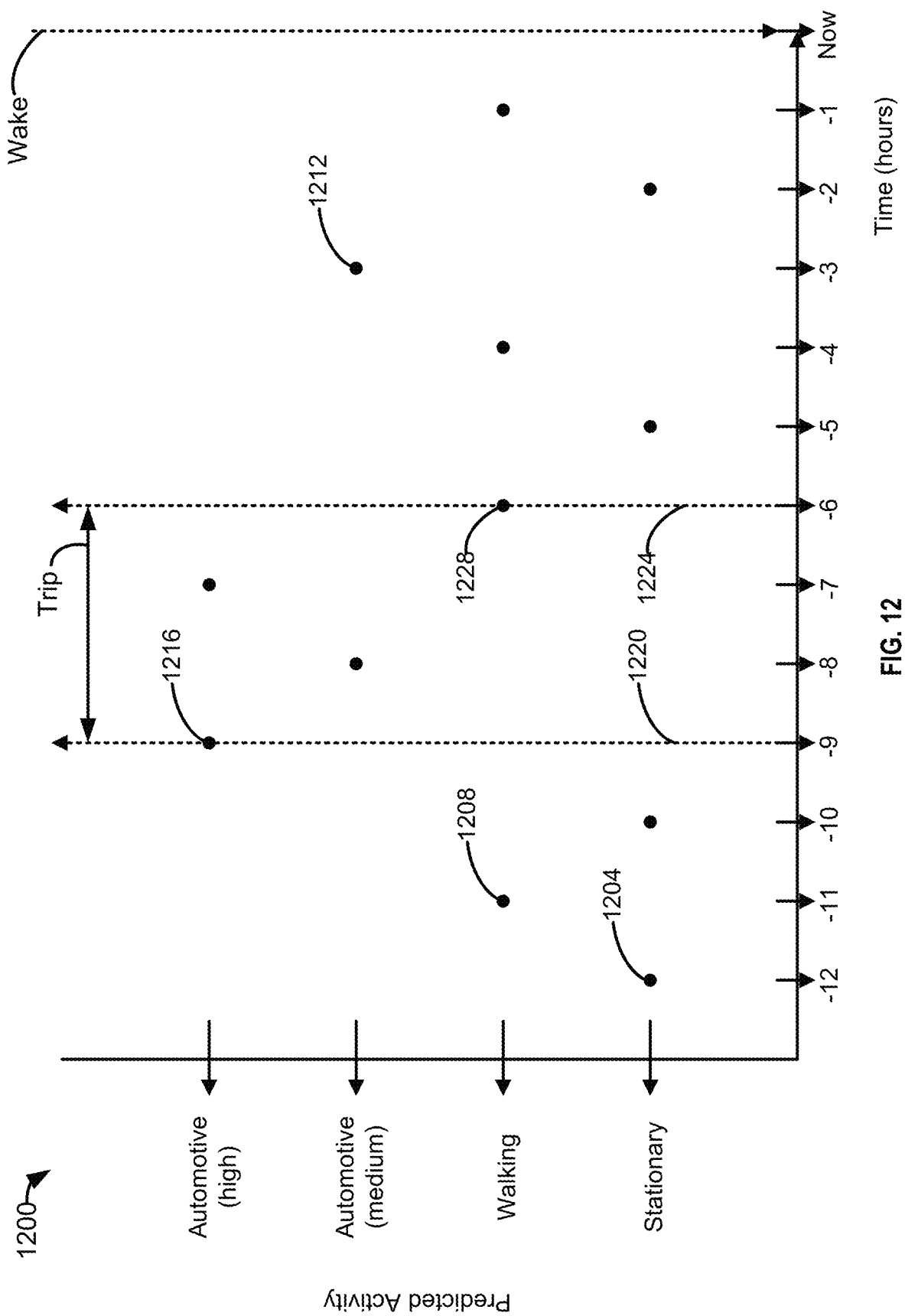
FIG. 12 is an exemplary representation of a graph data structure 1200 generated by an activity detection engine data according to some embodiments.

FIG. 12 is an exemplary representation of a graph data structure 1200 generated by an activity detection engine data according to some embodiments. A data collection application executing on the mobile device collects measurements from one or more sensors (e.g., such as sensor from sensor data block 108 of FIG. 1). While executing, the data collection application may consume resources (e.g., processing, network bandwidth, power, and the like) of the mobile device. In some instances, the data collection application may only intend to capture sensor data that corresponds to a predetermined activity type (e.g., such as a drive or the like). Capturing sensor data of other activities (e.g., when the mobile device is stationary) may waste the resources of the mobile device. To reduce the resource consumption of applications of the mobile device, the operating system of the mobile device may capture and cache sensor data from some or all of the sensors of the mobile device over a predetermined time interval (e.g., 12 hours). When an application such as the data collection application executes (or returns from a suspended state), the application may request the sensor data collected by the operating system over the preceding predetermined time interval (e.g., up to the preceding 12 hours) while the data collection application was not executing.

The operating system of the mobile device may also generate a probability of a contemporaneous activity of the mobile device over the predetermined time interval. The operating system may generate a probability that the mobile device is stationary, with a user who is walking, with a user who is running, with a user who is riding a bicycle, with a user who is driving, with a user who is flying, or the like). The activity detection engine can access the activity data generated by the operating system over the predetermined time interval and use the activity data to identify potential missed drives (e.g., drives in which the data collection application did not obtain sensor data). For example, if the data collection application suspended or otherwise not executing and a the mobile device fails to detect that a geofence was crossed (if one was generated), the data collection application may not collect or analyze the sensor data from the drive. Instead, the activity detection engine may identify the missed drive from the activity data generated by the operating system and collect the portion of the sensor data collected by the operating system while the data collection application was suspended or not executing.

In some instances, the data collection application may request that the operating system collect sensor data. The activity detection engine may indicate a time interval over which the sensor measurements are requested (e.g., up to a maximum allowed by the operating system such as 12 hours or the like). The operating system may then cache sensor data over the time interval while the data application is not executing (or is suspended). When the data collection application executes (or returns from suspension), the activity detection engine accesses the activity data collected by the operating system (e.g., through an application programming interface exposed by the operating system). The data collection application may also generate a new request to the operating system to collect sensor data for a subsequent time interval such that the sensor data is always being collected either by the data collection application (when executing) or the operating system, (when the data collection application is not executing).

The activity detection engine may generate a graph data structure using the activity data received from the operating system. As previously described, the activity data includes, but is not limited to, a probability that the mobile device is: stationary, walking (e.g., the mobile device is with a user who is walking), driving low (e.g., low probability that the mobile device is with a user that is driving), drive medium (e.g., medium probability that the mobile device is with a user that is driving), drive high (e.g., a high probability that the mobile device is with a user that is driving), cycling (e.g., the mobile device is with a user that is cycling), and the like. Any activity may also be represented by the graph data structure such as those enumerated by a user (e.g., through user input or the like), those detected by another application of the mobile device, or any other activity that can be detected through analysis of the sensor measurements. The activity detection engine may receive identification of any quantity of activities over the preceding time interval. The activity detection engine may obtain an indication of an activity in regular intervals (e.g., by polling the operating system) such as every half hour, hour, etc. Alternatively, the activity detection engine may receive an indication of an activity each time the operating system detects a new activity (e.g., push notification from the operating system).

In some instances, the activity detection engine may receive a probability (e.g., a confidence that the activity is occurring) for each of multiple activities. In those instances, the activity detection engine represents, in the graph data structure, the activity with the highest probability. Alternatively, the activity detection engine may represent only those activities with a probability that exceeds a threshold. For instance, the activity detection engine may only represent activities with a probability that exceeds 40% in the graph data structure. If no activities exceed the 40% threshold, the graph data structure may not include activities at that time (e.g., the activity may be represented as a null value). Alternatively, the data collection engine may represent all activities in the graph data structure with the corresponding probability of each activity.

The graph data structure 1200 includes a preceding time interval of 12 hours from a wake event (e.g., a time in which the data collection application is executed or wakes from suspension). A wake event may be any predetermined event such as, but not limited to, the mobile crossing a geofence (or any particular boundary), a visit notification, a notification from a notification service (e.g., known as a "push notification"), a scheduled time, detecting sensor data indicative of movement, or the like). A visit may be a notification from the operating system of the mobile device indicating that the mobile device is located at a location for long enough that the operating system determines that the mobile device is "visiting" the location. The visit may correspond to any location in which the mobile device is positioned for longer than a threshold time interval. For example, a location may correspond to an establishment (e.g., a business, public institution, residence, or the like). The activity detection engine received activity data for each hour of the preceding 12-hour time interval and represented, in the graph data structure, the activity having the highest probability (if more than one activity was received). For instance, at minus 12 hours (e.g., 12 hours prior to execution of the data collection application) the activity 1204 corresponds to stationary, at minus 11 hours the activity 1208 corresponds to walking, at minus three hours the activity 1212 corresponds to drive medium, and at minus nine hours the activity 1216 corresponds to drive high.

The activity detection engine can identify a missed drive using the activity data of the graph data structure 1200. For instance, the activity detection engine identifies a first time 1220, which is an earliest time in which an activity drive high is detected. The activity detection engine identifies activity 1216 as the activity that corresponds to the first time 1220. In some instances, the activity detection engine identifies the earliest time of any driving activity (e.g., medium or high). In the graph data structure 1200, the first time 1220 was detected at minus nine hours (e.g., nine hours prior to execution of the data collection application). The activity detection engine then identifies a second time 1224, which is the earliest time after the first time in which a different activity is detected. For example, the activity detection engine identifies activity 1228 as being the next activity that is not a drive activity. The different activity may be any activity other than a driving activity, such as walking or stationary in the example described by graph data structure 1200. In some instances, the activity detection engine identifies a second time that corresponds to an activity that is anything other than driving high (e.g., driving medium, walking, cycling, or stationary). For instance, the second time may correspond to an activity of drive even if the probability of a drive activity occurring is medium, low, or zero. The activity detection engine then identifies a missed drive that occurred over a time interval that includes minus nine hours to minus six hours.

The activity detection engine may then identify if another missed trip occurred by identifying a third time, which is an earliest time after the second time in which a driving activity is detected and a fourth time, which is an earliest time after the third time in which an activity other than a drive was detected. The process may continue until all missed drives are identified. Although the process of identifying missed trips begins by analyzing from an earliest time (e.g., minus 12 hours) to a wake event, the process may operate by analyzing activity data from the wake event towards the earliest time.

The data collection application may receive the sensor data from the operating system over the time intervals in which a missed drive occurred (e.g., from minus nine hours to minus six hours as depicted in graph data structure 1200). This prevents the data collection application from having to analyze sensor data that correspond to time intervals that likely do not correspond to a drive.

Figure 13:
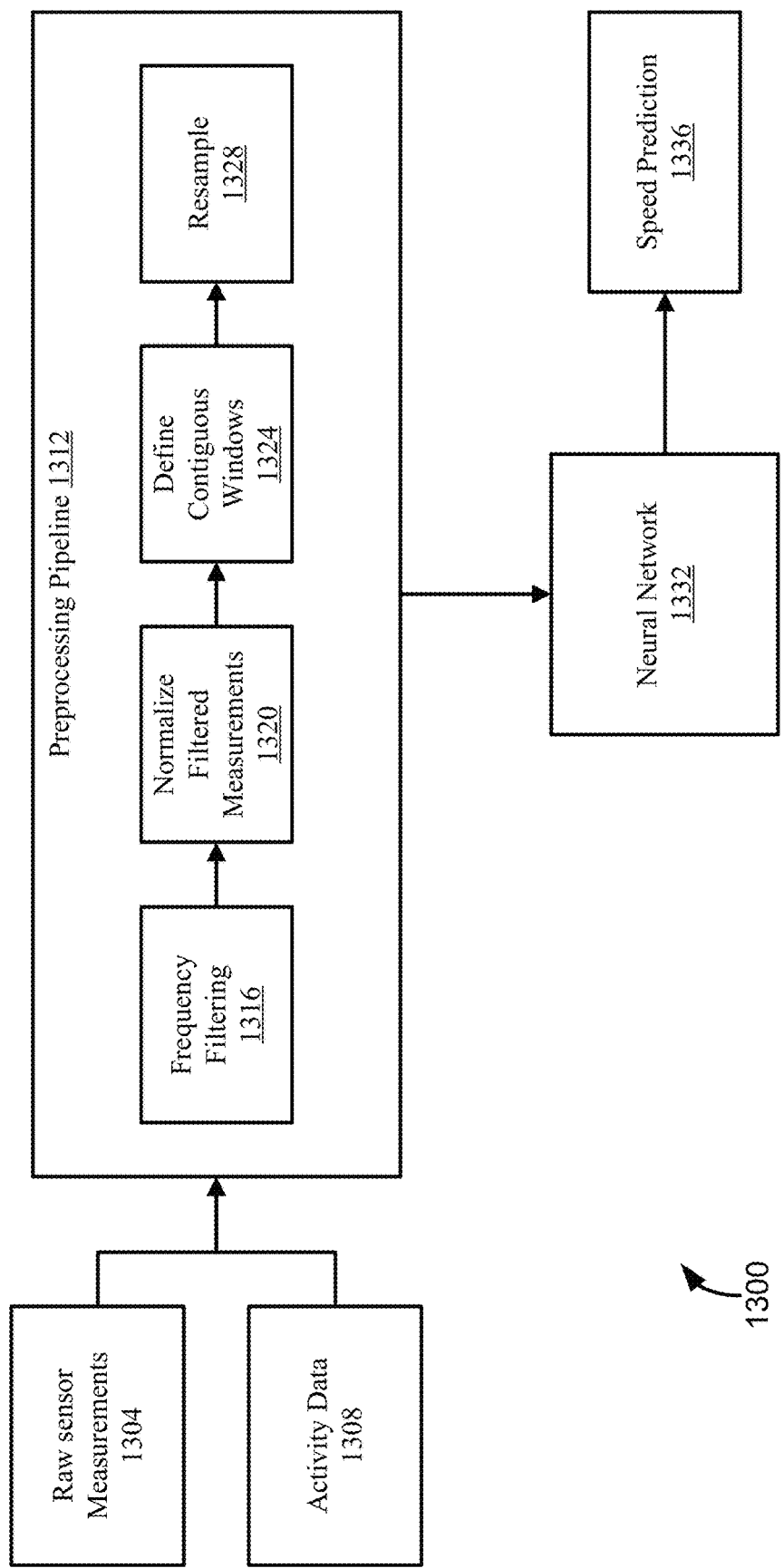
FIG. 13 is an exemplary block diagram of system 1300 for predicting the speed of a vehicle from mobile device sensor measurements according to some embodiments.

FIG. 13 is an exemplary block diagram of system 1300 for predicting the speed of a vehicle from mobile device sensor measurements according to some embodiments. System 1300 generates one or more predictions of a speed of a vehicle from sensor measurements received by a mobile device positioned within the vehicle. In some instances, the processes described in FIG. 13 are executed in real-time by the mobile device as the mobile device receives sensor measurements from sensors of the mobile device. In other instances, the process may be executed partially by the mobile device and partially by one or more other devices (e.g., such as servers, mobile devices, computing systems, or the like) or entirely by the one or more other devices.

System 1300 receives raw sensor measurements 1304 from one or more sensors of the mobile device (e.g., such as an accelerometer, magnetometer, or the like). The raw sensor measurements can include sensor measurements in one or more axis (e.g., x axis, y axis, and/or z axis). System 1300 also receives activity data 1308 that includes a prediction of an activity occurring at approximately a same time in which raw sensor measurements 1304 are received. For instance, the operating system (or activity detection engine) may determine a probability that the mobile device is positioned within the vehicle that is currently driving. Raw sensor measurements 1304 and activity data 1308 are input into processing pipeline 1312. Processing pipeline 1312 includes four stages: frequency filtering 1316, normalize filtered measurements 1320, define contiguous windows 1324, and resample 1328. The output of processing pipeline 1312 can be input into a neural network (or other machine-learning model), which will generate a prediction of a speed of the vehicle.

Frequency filtering 1316 includes filtering out a portion of the data values that occur at particular frequencies. For instance, the raw sensor measurements may be converted to a frequency domain using a transform (e.g., Fourier, or the like). Once in the frequency domain, the raw sensor measurements may be filtered to eliminate noise or data values that are less accurate in the vehicle speed predictions. Frequency filtering 1316 filters out frequencies that are greater than a threshold frequency. In some instances, the threshold may be, for example, a frequency from 9-50 Hz. The frequency threshold may be selected by a process of system 1300, a user, a communication received from a remote device or the like. Processing pipeline 1312 then passes the remaining raw sensor measurements normalize filtered measurements 1320, where the remaining raw sensor measurements are normalized to a predetermined scale.

Processing pipeline 1312 then defines contiguous windows 1324 that each include a portion of the normalized sensor measurements. The contiguous windows include a portion of a the normalized sensor measurements (in the time domain) that were received during a time interval. The time interval length may be dynamically determined based on the normalized sensor measurements. For instance, a median delta may be defined as the median difference in time between two consecutive values of the normalized sensor measurements. A contagious window may be defined each time the time interval between two consecutive values is greater than a threshold that is based on the median delta. In some instances, the threshold may be a multiple of the standard deviation from the median delta, such as a one standard deviation, two standard deviations, three standard deviations, etc. In other instances, the threshold may be selected by a user or from input received from another device. Any number of contiguous windows may be defined for the normalized sensor values including one (e.g., such as when a time difference between each consecutive values of the normalized sensor measurements is not greater than threshold 1412) or any number greater than one.

Alternatively, defining contiguous windows 1324 may generate uniform windows. For instance, each contiguous window may be of a predetermined time interval length such as, but limited to, five seconds, 10 seconds, 30 seconds, one minute, etc. The predetermined time interval length may be predetermined (e.g., prior to runtime), dynamically selected (at any time after runtime), selected based on user input, selected based on a value received from an remote computing device, or the like.

The last stage of processing pipeline 1312 includes resampling 1328 in which the contiguous windows are resampled to a predetermined frequency. The predetermined frequency may be a frequency selected by the processing pipeline 1312, system 1300, the mobile device, a user, a remote device, or the like. In some instances, the predetermined frequency may be a frequency from 9-50 Hz.

The output from processing pipeline 1312 may be the processed sensor measurements that correspond to each contiguous window. The processed sensor measurements that correspond to a contiguous window are passed to neural network 1332 which generates predicted speed 1336 for each time unit (e.g., defined based on the median delta, by user input, or as some division of the total time interval of the contiguous window) included in the contiguous window. For instance, if the contiguous window includes 10 seconds of processed sensor measurements and the time unit is one second, then the contiguous window would include 10 time units and the neural network 1332 may output 10 predicted speed values. If the contiguous windows are not of uniformed length (e.g., but based on a time difference between two values being greater than a multiple of the standard deviation from the time delta), then neural network 1332 may generate a different quantity of predictions for each contiguous window.

Figure 14:
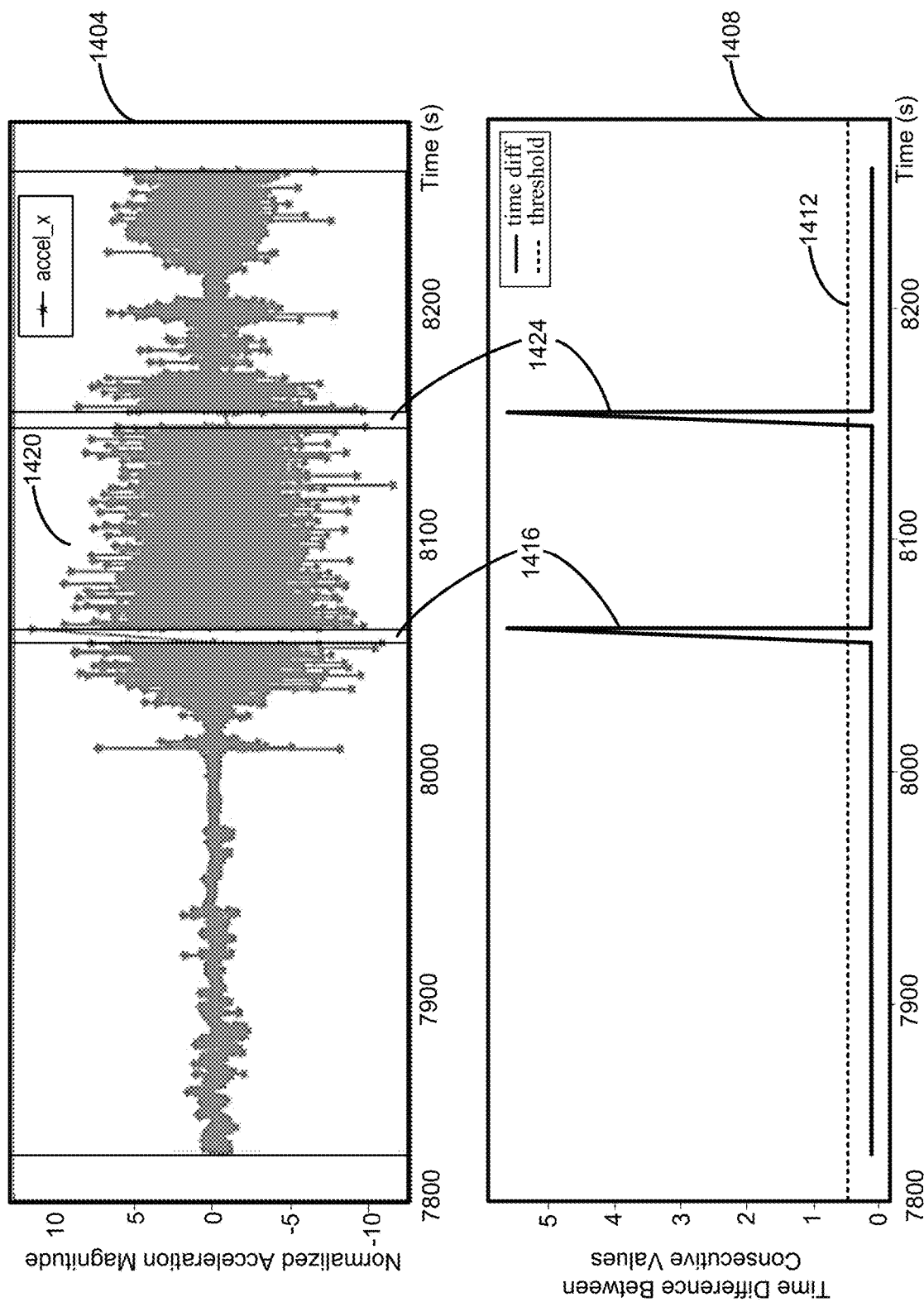
FIG. 14 is an exemplary set of graphs illustrating the division of processed sensor measurements into contiguous windows according to some embodiments.

FIG. 14 is an exemplary set of graphs illustrating the division of processed sensor measurements into contiguous windows according to some embodiments. Graph 1404 includes a plot of normalized acceleration values with the x-axis representing time. Graph 1408 includes a plot of the median difference between two consecutive values of the normalized acceleration values vs time. As a result, each set of consecutive values plotted in graph 1404 has a corresponding value plotted in graph 1408. Graph 1404 includes a first contiguous window that may be defined prior to the beginning of the plot (e.g., at some time prior to time 7800). The first contiguous window extends until the time difference between consecutive values of the normalized acceleration values exceeds threshold 1412. For example, at 1416, there is a time difference between consecutive values that is significantly larger than the threshold 1412 at time 8050, which signifies the end of the first contiguous window and the beginning of second contiguous window 1420. At 1424, there is another time difference between consecutive values that is significantly larger than the threshold 1412 at time 8150, which signifies the end of second contiguous window 1420 and the beginning of a third contiguous window. In some instances, graphs 1404 and 1408 may be rendered or displayed. In other instances, graphs 1404 and 1408 may not be rendered or displayed. In still yet other instances, graphs 1404 and 1408 may be represented as a metadata, data, a data structure or the like. Moreover, while graphs 1404 and 1408 illustrate segmenting normalized acceleration values in the x-axis into contiguous windows, other inputs may be used in addition to or in place of normalized acceleration values in the x-axis such as, but not limited to normalized acceleration values in the y-axis, normalized acceleration values in the z-axis, normalized acceleration magnitude, activity data, or the like.

Figure 15:
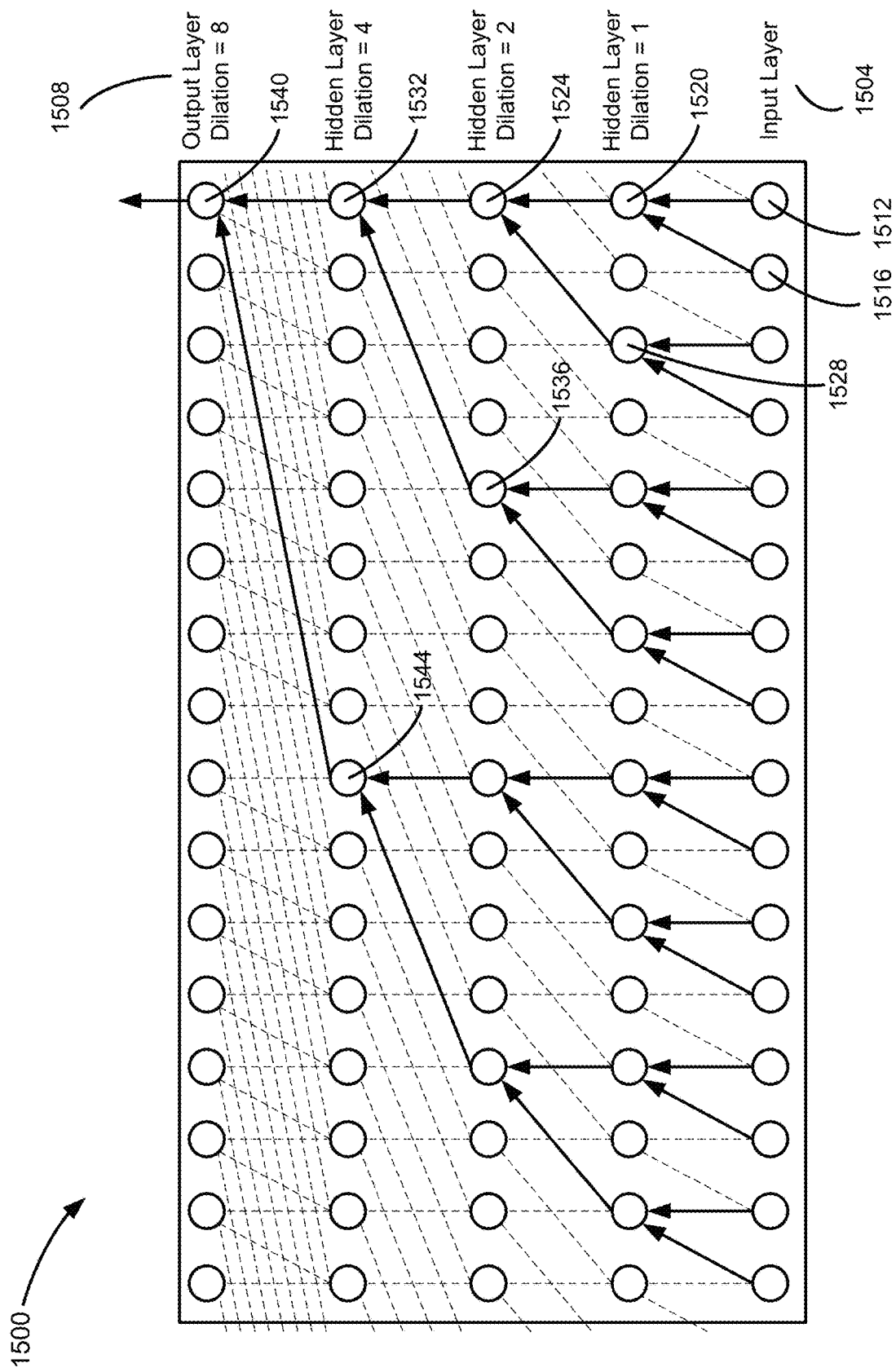
FIG. 15 is an exemplary representation of the layers of a neural network that can generate a prediction of the speed of a vehicle according to some embodiments.

FIG. 15 is an exemplary representation of the layers of a neural network that can generate a prediction of the speed of a vehicle according to some embodiments. Neural networks include input layer 1504 (e.g., where features are input to the neural network), output layer 1508, and one or more hidden layers positioned between the input layer and the output layer. Each layer includes a one or more neurons that are each connected to one or more neurons of a previous layer (except for the input layer) and one or more neurons of subsequent layer (except for the output layer). Each neuron of each hidden layer provides a non-linear transformation of the features received from a previous layer. Weights may be assigned to the connections between neurons to direct the transformation that is applied to the features.

Neural network 1500 may be a convolutional neural network, which includes one or more convolution layers, in addition to or in place of, the hidden layers. Each neuron of a convolution layer includes a kernel defined by hyperparameters that is convolved across the features received from a previous layer. In some instances, the convolution layers may be dilated convolutions in which the kernel is applied over a larger area (of input features from the previous layer) than its length (e.g., the layer's distance from the input layer). Each subsequent layer may include additional dilations. For example, a first convolution layer may include a dilation of one in which the kernel of neuron 1520 is applied over an area of one (e.g., one neuron from the neuron adjacent to neuron 1520). The kernel of neuron 1520 may be applied to neurons 1512 and 1516. The second convolution layer may include a dilation of two in which the kernel of neuron 1524 is applied over an area of two from the adjacent neuron 1520 of the previous layer. The kernel of neuron 1524 may be applied to neurons 1520 to neuron 1528.

Continuing the example, the next layer includes a dilation of four and the kernel of neuron 1532 is applied an area of four from the adjacent neuron 1524 of the previous layer. The kernel of neuron 1532 is applied from 1524 to 1536. The last layer depicted has a dilation of eight. The kernel of neuron 1540 is applied from neuron 1532 to neuron 1544 (e.g., eight neurons from neuron 1532). Neural network 1500 may include any number of neurons (e.g., 64, 128, 256, etc.), each being configured to apply a kernel. Neural network 1500 may include any number of dilations. For instance, in addition to the dilations 1, 2, 4, and 8, shown, neural network may include 16, 32, 64, etc. with each subsequent dilation being double the previous layer's dilation.

Input features 1512 and 1516 correspond to sensor measurements received over time (e.g., from right to left being from time (T) T=0 to time T=∞). For instance, input feature 1512 may correspond to accelerometer measurements collected at time T=0 and input feature 1516 may correspond to accelerometer measurements collected at the next subsequent time interval T=1 (where the time between T=0 and T=1 may be of any amount of time such as one second, one millisecond, etc.). Dilated convolutions enable the neural network to include a larger receptive field of input features, which enables selective use of sensor measurements across a larger time interval. For instance, a neural network, such as neural network 1500, that includes 128 kernels and dilations of 1, 2, 4, 8, 16, and 32, would include a receptive field of 96. This means the neural network would have 96 inputs (e.g., 96 discrete sensor measurements or the sensor measurement collected over 10.6 seconds). This improves the efficiency of the neural network by improving both the speed and accuracy of the predictions generated by the neural network (e.g., speed prediction, crash prediction, etc.).

Figure 16:
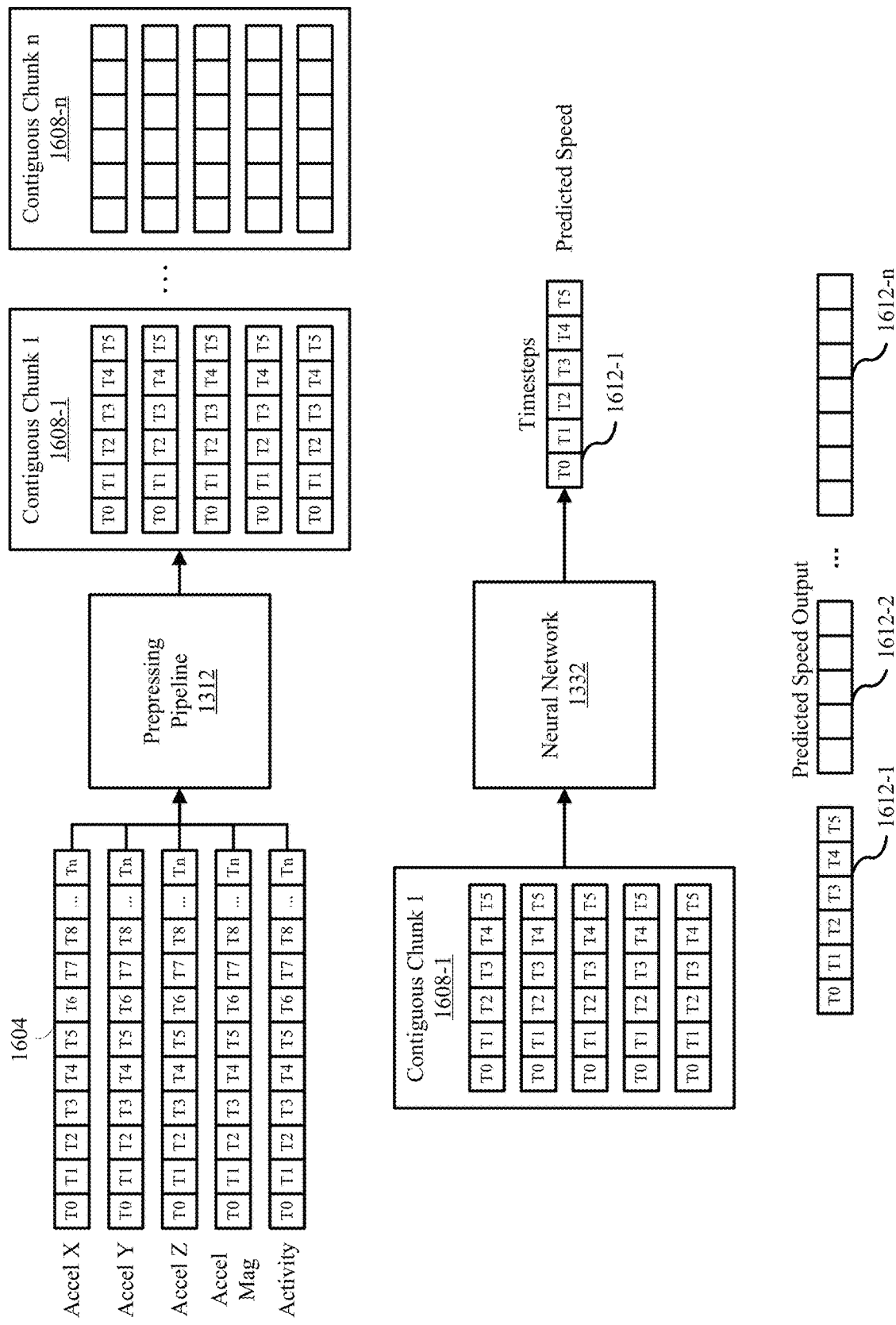
FIG. 16 is exemplary block diagram of a system for predicting speed of a vehicle that correspond to time steps using mobile device sensor measurements according to some embodiments.

FIG. 16 is exemplary block diagram of a system for predicting speed of a vehicle that correspond to time steps using mobile device sensor measurements according to some embodiments. A set of sensor measurements 1604 may be received as input. For example, a mobile device, such as mobile device 104, collects the set of sensor measurements from sensors of the mobile device while the mobile device is disposed within the vehicle. The set of sensor measurements includes one or more sensor measurements collected over a time interval (e.g., from T0 to Tn) where each sensor measurement is associated with the time, T, in which the measurement was collected. The set of sensor measurements may include one or more acceleration measurements in the x-axis, one or more acceleration measurements in the y-axis, one or more acceleration measurements in the z-axis, one or more acceleration magnitude measurements, an identification of a current activity from Activity Data for each time in which there is an acceleration measurement, combinations thereof, and the like. In some instances, in addition to acceleration measurements, the sensor measurements may include gyroscopic measurements, magnetometer measurements, GPS measurements, combinations thereof, or the like.

Preprocessing pipeline 1312 may receive sensor measurements 1604 and generate a series of contiguous chunks 1608 of processed sensor measurements. Each contiguous chunk 1608 may correspond to processed sensor measurements that correspond to a contiguous window (e.g., as described in connection to FIGS. 13 and 14). For example, contiguous chunk 1 1608-1 may include the processed sensor measurements of sensor measurements collected over a first contiguous window. These processed sensor measurements may include one or more values for each input sensor type (e.g., acceleration measurements in the x-axis, acceleration measurements in the y-axis, acceleration measurements in the z-axis, acceleration magnitude, and activity data). Any number of contiguous chunks may be generated by preprocessing pipeline 1312. Since each contiguous chunk includes processed sensor measurements of sensor measurements collected during a contiguous window and since contiguous windows may be of varying lengths, the quantity of sensor measurements of each contiguous chunk 1608-1-1608-$n$ may be different (e.g., from a single value for each sensor type to any particular quantity of values for each sensor type).

The neural network receives the contiguous chunks as input and generates, for each time for which there is sensor measurements, a predicted speed of the vehicle 1612-1-1612-$n$. For instance, since contiguous chunk 1 1608-1 includes sensor measurements for times T0-T5, neural network 1332 may generate a predicted speed 1612-1 of the vehicle for each of T0-T5. Neural network 1332 may then receive the next contiguous chunk 1608-2 (not shown) and generate predictions 1612-2 for each time unit in that contiguous chunk. This process may continue generating predictions 1612-$n$ until there are no more contiguous chunks for the neural network.

Figure 17:
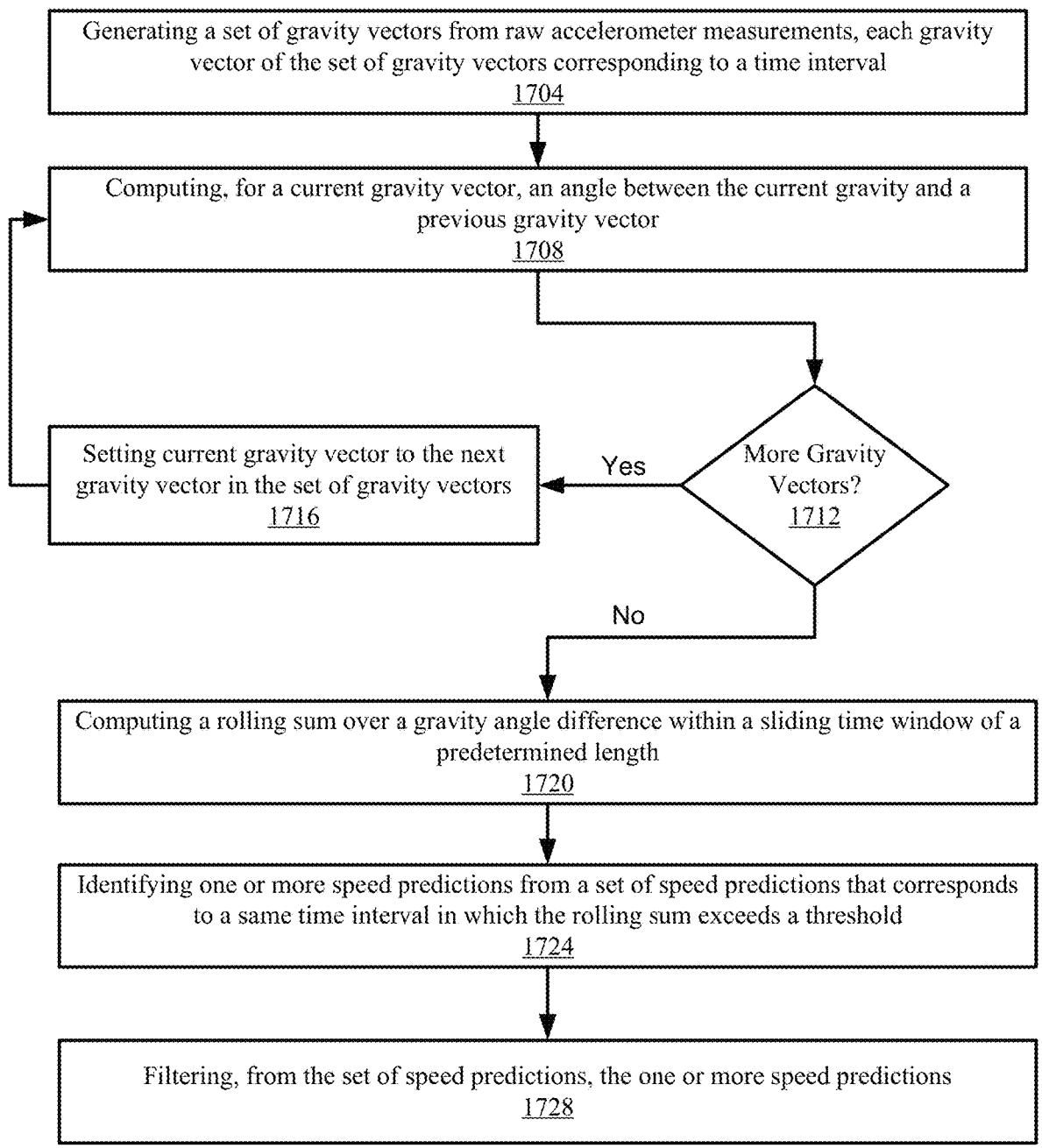
FIG. 17 is a flowchart of example of a process for filtering speed predictions according to aspects of the present disclosure.

FIG. 17 is a flowchart of example of a process for filtering speed predictions according to aspects of the present disclosure. The process includes generating a set of gravity vectors from raw accelerometer measurements, each gravity vector of the set of gravity vectors corresponding to a time interval (block 1704). Each gravity vector of the set of gravity vector may be one dimensional (e.g., incorporate raw accelerometer measurements from a single axis such as the x-axis, y-axis, or z-axis), two dimensional (e.g., incorporate raw accelerometer measurements from two axes), or three dimensional (e.g., incorporate raw accelerometer measurements from the x-axis, y-axis, and z-axis). Each gravity vector may be associated with the time in which the corresponding raw acceleration measurements were collected. Gravity vectors may be generated in predetermined regular intervals (e.g., referred to herein as time steps) that may be determined based on the sampling rate of the accelerometer or by a user. For example, a gravity vector may be generated every half second, second, or the like.

In some instances, each gravity vector may be derived from a median of a set of raw acceleration signals. This may prevent signal noise from the accelerometer from propagating to the derived gravity vector. For instance, a rolling window may be defined with a fixed length time interval. The median accelerometer measurements collected over the time interval may be used to derive a gravity vector. For example, the sliding window may include 22 seconds (e.g., T=0-22) of raw accelerometer measurements and derive a first gravity vector from the median accelerometer measurements collected over the 22 seconds sliding window. The sliding window may than increment such that the sliding window includes a newest raw accelerometer measurement and discards an oldest raw accelerometer measurement (e.g., T=1-23, where the window no longer includes the accelerometer measurement collected at T=0, but includes an accelerometer measurement collected at T=23). A second gravity vector may be derived from the raw accelerometer measurements that are within the sliding window. The sliding window may increment in real time, when a new accelerometer measurement is received, at a predetermined time intervals (e.g., every 0.5 seconds, every 1 second, etc.), or the like.

The process continues by computing an angle between a current gravity vector and a previous gravity vector (e.g., computing the "gravity angle difference") (block 1708). The process may begin at a first gravity vector in which a previous gravity vector exists to calculate the angle between and continue for each successive gravity vector in the set of gravity vectors until there are no more gravity vectors. In some instances, the previous gravity vector may be the immediately previous gravity vector to the current gravity vector. In this instance, the process may begin at the second gravity vector (as the current gravity vector) since there exists an immediately previous gravity vector from which to calculate the angle. In other instances, the previous gravity vector may be of a predetermined distance from the current gravity vector, such as five gravity vectors previous to the current gravity vector, 10 gravity vectors previous to the current gravity vector, etc.

The process continues by determining if there are more gravity vectors (e.g., there is a gravity vector that was derived after the current gravity vector in the set of gravity vectors) (block 1712). If so, the process continues by setting the current gravity vector to the next gravity vector in the set of gravity vectors (block 1716) and returning to block 1708. Blocks 1708-1716 form a loop over the set of gravity vectors. The current gravity vector (at block 1708) is initially set to the first (and oldest) gravity vector in the set of gravity vectors and iterates through the set of gravity vectors computing the gravity angle difference between the current gravity vector and the previous gravity vector until there are no more gravity vectors in the set of gravity vectors. Once the loop has concluded, a gravity angle difference value will be available for each time step (e.g., the quantity of gravity angle difference values may be approximately equal to or less than the quantity of gravity vectors in the set of gravity vectors).

The process continues by computing a rolling sum over a gravity angle difference within a sliding time window of a predetermined length (block 1720). For example, the sliding window may 10 seconds, 15 seconds, 20 seconds, or the like. The process computes the sum of the gravity angle difference values that are within the sliding window (e.g., T=5 to T=20). The sliding window is then incremented by one time step and another sum is calculated using the gravity angle values that are within the incremented sliding window (e.g., T=6 to T=21). The rolling sum over a gravity angle difference within a sliding time window may be referred to as the "sum sliding window gravity angle difference." In some instances, a "sum sliding window gravity angle difference" may be computed for each time step in which there is a gravity angle difference value. In other instances, a "sum sliding window gravity angle difference" may be computed for each complete sliding window. For example, for a sliding window of length x, the sliding window would not be complete until T=x. In those instances, a "sum sliding window gravity angle difference" may be computed for all values that exist at T greater than or equal to x.

The process then continues by identifying one or more speed predictions from a set of speed predictions that corresponds to a same time interval in which the rolling sum exceeds a threshold (block 1724). The set of speed predictions includes a predicted speed of the vehicle for each time step in which there is a "sum sliding window gravity angle difference." The process identifies each "sum sliding window gravity angle difference" that exceeds a threshold value. In some instances, the threshold may be dynamic. For instance, the threshold may be more or less sensitive based on detected events. If a vehicle crash is detected, for example, the threshold may be sensitive with respect to the time interval immediately following the detected vehicle crash. The process then identifies the one or more speed predictions that correspond to a same time step as the "sum sliding window gravity angle differences" that exceed the threshold value.

The process continues by filtering from the set of speed predictions the one or more speed predictions (block 1728). In some instances, the acceleration measurements may include unwanted values and may be partly the result of a user handling the mobile device instead of the vehicle, noise, or the like. Use of these acceleration values to generate speed predictions may yield inaccurate results. The "sum sliding window gravity angle difference," representing the volatility of the acceleration measurements, may be used as a filter to remove speed predictions that correspond to accelerations measurements with a high degree of variability (e.g., likely to be the result of non-vehicular forces or noise). When the "sum sliding window gravity angle difference" exceeds the threshold value at a time step (e.g., acceleration measurements at that time step have a high degree of volatility), the speed prediction that corresponds to that time step may be filtered from the set of speed predictions.

In some instance, the process may continue indefinitely provided there are acceleration measurements to process. For instance, blocks 1704-1728 may execute continuously while the mobile device is positioned in the vehicle on a trip (e.g., the vehicle is moving from a starting location to a destination location). The process may derive speed predictions and filter those speed predictions in real time. In other instances, blocks 1704-1728 may execute once the trip has concluded. For instance, during the trip the mobile device may collect sensor measurements throughout the drive. Once the drive concludes, the sensor measurements nay be processed in a batch process to both generate a set of speed predictions over the trip and filter those speed predictions.

In still yet other instances, the process of 1704-1728 may execute as semi-batch process in which blocks 1704-1728 may execute each time a predetermined amount of sensor measurements is collected (e.g., based on a threshold quantity of memory, enough to generate a predetermined quantity of gravity vectors, the time interval between when the vehicle starting moving to when the vehicle stopped moving, or the like) and/or upon completion of the trip (e.g., in the instance where less than a threshold amount of sensor measurements were collected, but the trip concluded).

Figure 18:
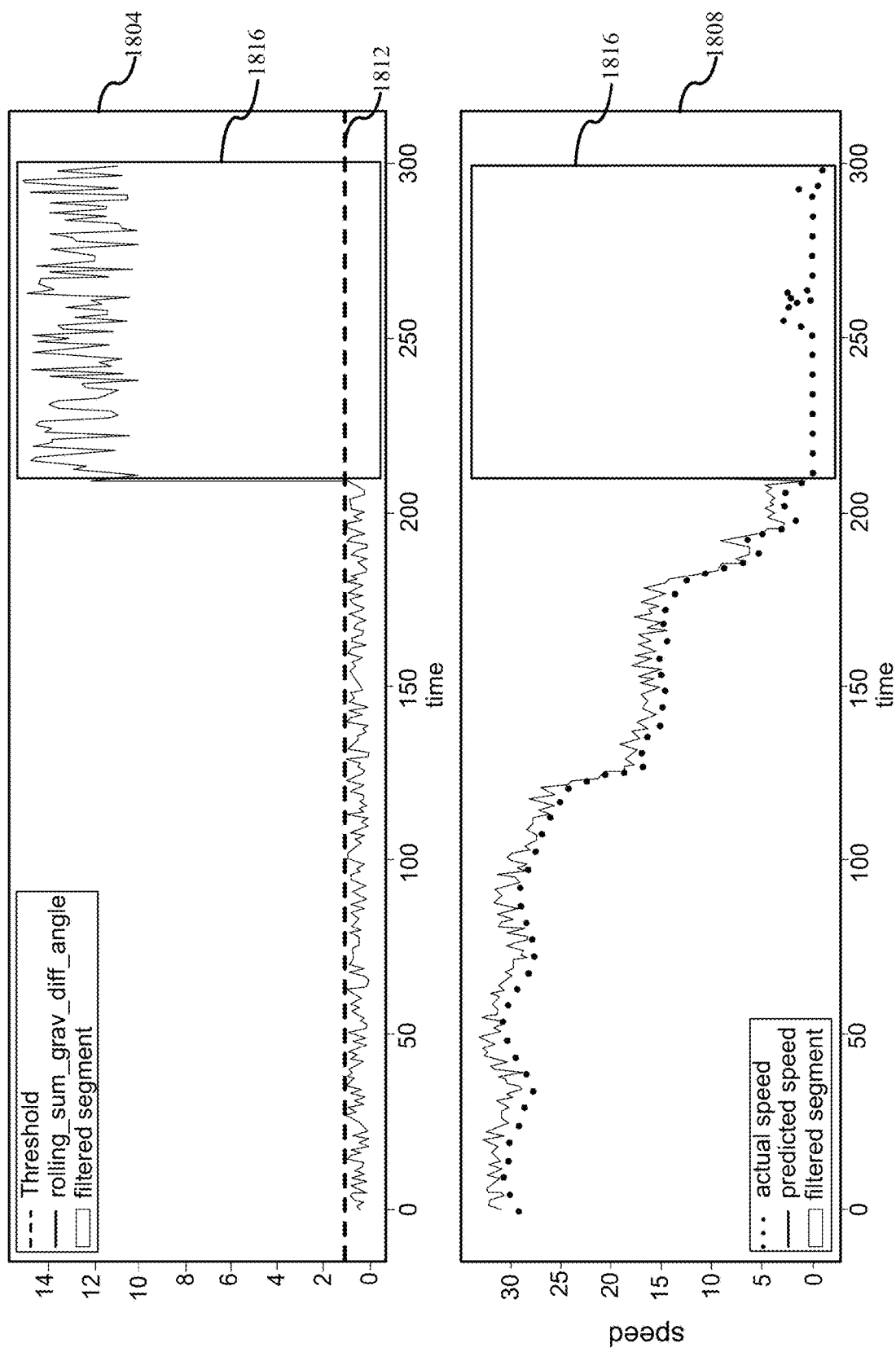
FIG. 18 includes graphs illustrating an example in which the "sum sliding window gravity angle difference" is used to filter speed predictions according to aspects of the present disclosure.

FIG. 18 includes graphs illustrating an example in which the "sum sliding window gravity angle difference" is used to filter speed predictions according to aspects of the present disclosure. Graph 1804 is a plot of the "sum sliding window gravity angle difference" over time. Graph 1808 is a plot of the actual speed of a vehicle and the predicted speed of the vehicle over the same time interval as graph 1804. Graphs 1804 and 1808 provide an illustration of an example in which speed predictions are filtered according to the process of FIG. 17. In graph 1804, when the "sum sliding window gravity angle difference" exceeds threshold 1812, as it does at approximately 210 seconds, the system begins filtering the corresponding speed prediction values 1816. Graphs 1804 and 1808 provide a graphical representation of the filtering of speed prediction values. During the process of filtering speed predictions (e.g., the process of FIG. 17), the derived values (e.g., predicted speed, the "sum sliding window gravity angle difference".) may not be represented graphically (as shown FIG. 18), but instead represented as data, as data structure, or the like.

Figure 19:
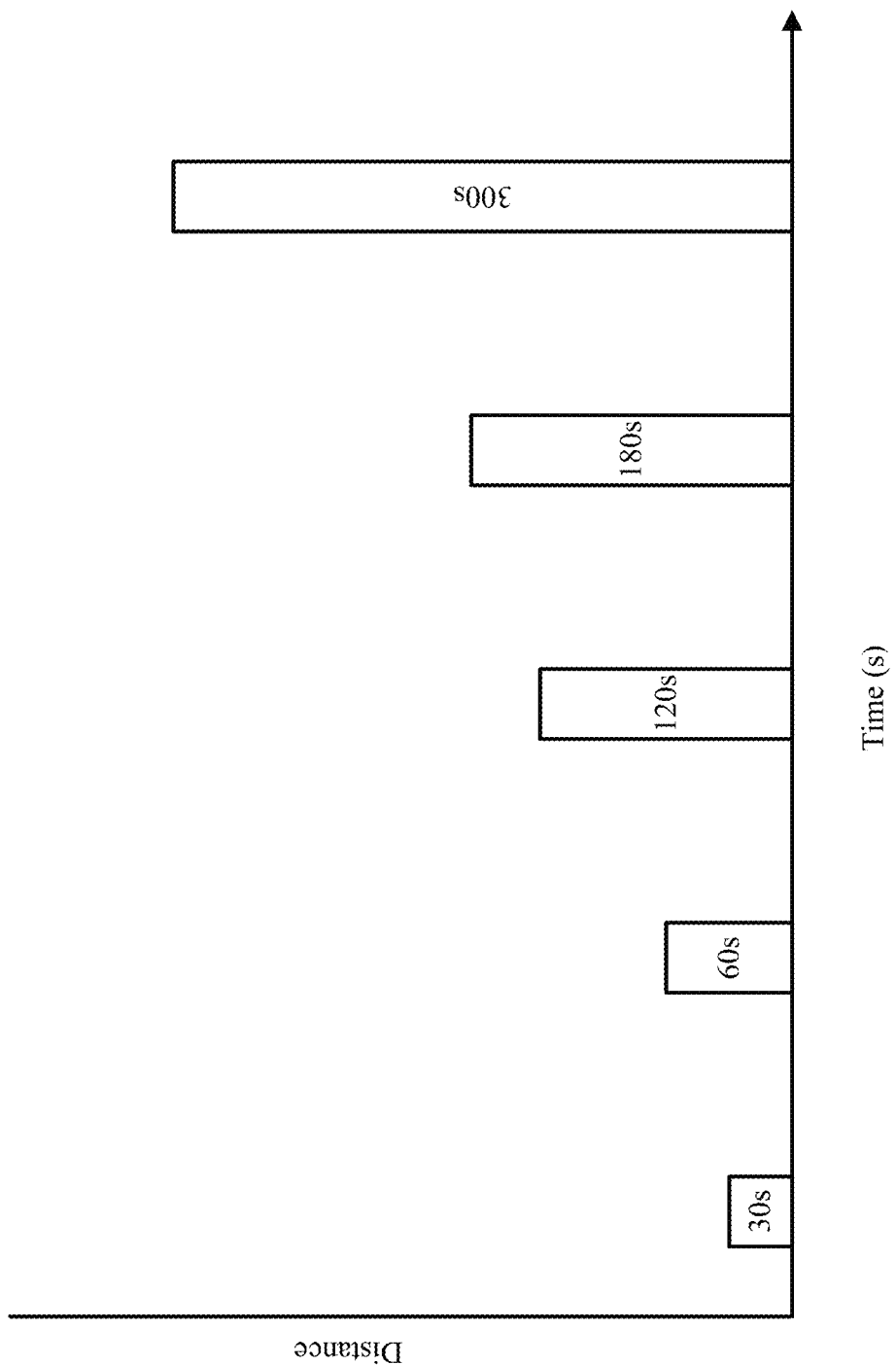
FIG. 19 is exemplary graph depicting the use of speed prediction to derive features for machine-learning model to generate a crash prediction according to some embodiments.

FIG. 19 is exemplary graph depicting the use of speed prediction to derive features for machine-learning model to generate a crash prediction according to some embodiments. A machine-learning model may generate crash predictions for a vehicle that is in operation. In some instances, signal noise or other non-vehicular forces (e.g., such as a user operating the mobile device) may cause a false positive where a crash is detected, but no crash occurred. Additional features that characterize the environment of the vehicle after the crash occurred may be used to improve the accuracy of predicted crashes (e.g., eliminating false positives) and as input to the machine-learning model to refine the model or retraining.

For example, after a collision, a driver of a vehicle should bring the vehicle to a complete stop at a safe location. The driver may then survey the damage to the vehicle (e.g., to determine whether the vehicle is safe to operate), asses injuries, exchange information with other drivers, etc. Speed prediction may be used to determine if/when the vehicle comes to a stop after a detected crash. If the vehicle does stop within a predetermined time interval or distance after a detected crash, then the crash prediction is more likely to have been accurate. On the other hand, if the vehicle continues to drive after the detected crash, then the detected crash may be a false positive. The detection of the vehicle coming to a stop (based on the speed prediction) and the distance after the detected crash in which the vehicle came to a stop may be additional features that may be used to determine the accuracy of crash prediction (e.g., filter out false positives/negatives) and to further improve the accuracy of the machine-learning model in generating crash predictions (e.g., by labeling sensor data used to train the machine-learning model).

The distance from a location of a potential crash may be determined by computing the mean predicted speed over one or more windows after the time in which the crash was detected. The window may be of a fixed and predetermined length such as 30 seconds, 60 seconds, 120 seconds, 180 seconds, 300 seconds, or of any length set by the mean predicted speed (e.g., with a higher mean predicted speed having a larger window) a user. Distances can be calculated by multiplying the mean speed by the duration of each window). The distances may be calculated for each window using the predicted speed (e.g., as described in FIG. 13) and again using filtered speed (e.g., as described in FIG. 17-18). For the five windows depicted in FIG. 19 (e.g., 30 seconds, 60 seconds, 120 seconds, 180 seconds, 300 seconds), 10 distance features would be derived: one distance feature for each window using unfiltered predicted speed, and one distance feature for each window using filtered predicted speed. Additional distance features may be generated if additional windows are selected.

The distance features may be used to determine a predicted crash actually occurred. For example, if the vehicle comes to a stop within a predicted distance after a crash was detected, then it may be more likely that the crash occurred. On the other hand, if vehicle does not come to a stop within a predicted distance, then it may be more likely that the predicted crash was a false positive. In that case, the detected crash may be discarded and data collection by the mobile device may continue until the drive has concluded.

Alternatively or additionally, the distance features may be used as additional inputs for a machine-learning model configured to generate the crash predictions (e.g., either the same machine-learning model that generated the original crash prediction or a different machine-learning model). Generating a new crash prediction using the distance features as additional input may produce a crash prediction that is more accurate than the initial crash prediction.

In some instances, the additional information may be used to provide labels for future training. For example, if the driver did not stop after a crash was predicted, then the sensor data that was input to the machine-learning model may be labeled with "not a crash." Similarly, if the vehicle did stop after the predicted crash, then the sensor data that was input to the machine-learning model may be labeled with "crash." The labels assigned to the sensor data may be used by the machine-learning model to refine how machine-learning model generates future predictions, may improve the accuracy of the machine-learning model in generating future crash predictions.

Figure 20:
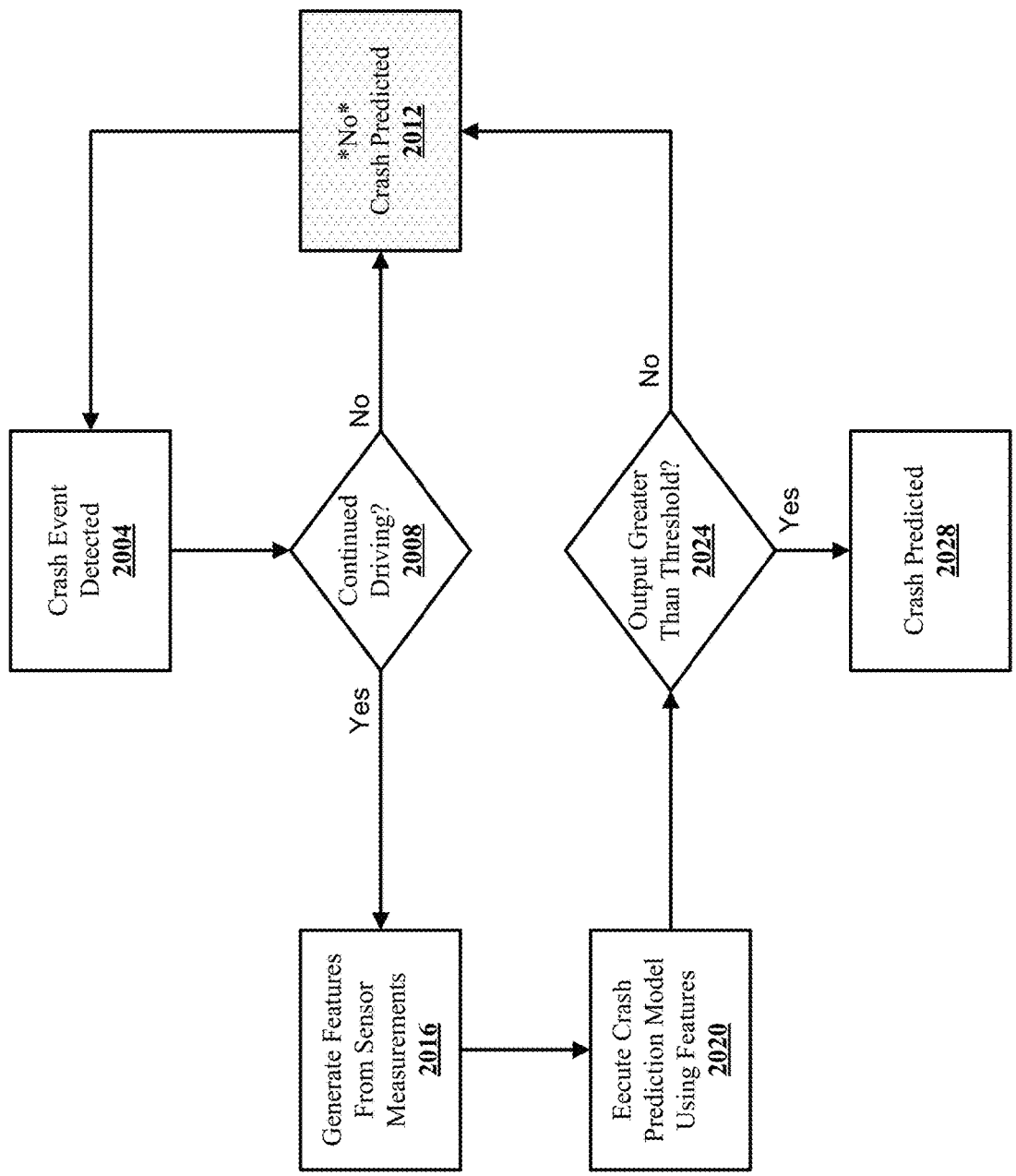
FIG. 20 is a block diagram of a process for predicting a vehicle crash according to aspects of the present disclosure.

FIG. 20 is a block diagram of a process for predicting a vehicle crash according to aspects of the present disclosure. At block 2004, a crash event associated with a vehicle is detected. A mobile device disposed within the vehicle may collect sensor measurements using sensors of the mobile device. These sensor measurements may be processed and passed as input into a crash prediction machine-learning model to generate a crash prediction. The crash prediction machine-learning model may be trained to generate crash predictions using sensor measurements (e.g., raw sensor measurements or processed sensor measurements such as those described by preprocessing pipeline 1312 of FIG. 13). The crash prediction machine-learning model may be trained using supervised learning, unsupervised learning, or semi-supervised learning. The crash prediction machine-learning model may generate crash predictions continuously (such as in regular intervals while the vehicle is in operation). In other instances, a crash prediction may be generated upon detecting anomalous sensor measurements (e.g., sensor measurements that exceed a threshold or the like).

At block 2008, it is determined whether the vehicle has come to a stop. For example, the mobile device may use sensor measurements to predict a speed of the vehicle (in real time, continuously, in regular intervals, upon detecting an event such as crash event, or the like). After the crash is detected, the mobile device may determine, after a predetermined time interval or distance from the crash event, whether the speed of the vehicle is greater than zero.

If the vehicle is still moving, the process moves to block 2012 in which it is determined that no crash occurred (e.g., the vehicle crash was a false positive) and the process of FIG. 20 returns to block 2004 and waits until another crash is detected or the vehicle is no longer in operation (e.g., the current trip has concluded).

If the vehicle came to a stop, then the process moves to block 2016 in which features may be generated from the sensor measurements. The features can include the features used by the machine-learning model to determine the original crash event at block 2004. The features may also include sensor measurements collected or derived after the crash event. For instance, the features may include one or more distance features corresponding to the distance that the car traveled after the crash occurred before coming to a stop as described in connection to FIG. 19. The one or more distance features may be derived by multiplying the mean predicted speed over each of one or more time windows (e.g., 30 seconds, 60 seconds, 120 seconds, 180 seconds, and/or 300 seconds). Alternatively or additionally, one or more distance features may be derived by multiplying the mean filtered predicted speed (e.g., as described in FIG. 17) over each of one or more time windows (e.g., 30 seconds, 60 seconds, 120 seconds, 180 seconds, and/or 300 seconds).

The distance features may provide additional information after the crash event that may provide an indication as to the severity of crash and whether the movement of the vehicle after the crash was the result of a crash event or other driving activities (e.g., reaching a destination, a stop sign or traffic light, traffic, etc.). For example, if the vehicle was disabled by the crash then the vehicle would almost immediately come to a stop after the crash. This may provide an indication that the crash event was severe enough to disable the vehicle (e.g., not a mere "fender bender"). If the vehicle continued to drive for a short duration before coming to a stop, then it may indicate that the crash event was not severe as the vehicle was able to continue operations. In another example, the distance features (with other information) may provide an indication that the vehicle stop was due to a stoplight or other routine driving operations, which may provide an indication that the crash event at 2004 was a false positive.

At block 2020, a crash prediction machine-learning model may be executed using the generated distance features to generate a new crash prediction. In some instances, this crash prediction machine-learning model may be the same machine-learning model executed at block 2004. In other instances, the crash prediction machine-learning model may be a second (different) machine-learning model. In those instances, the second machine-learning model may be trained using the sensor measurements with the distance features. The second machine-learning model may be trained using supervised learning, unsupervised learning, or semi-supervised learning.

The crash prediction machine-learning model may generate a new crash prediction based on the additional information of the generated distance features. The crash prediction machine-learning model may generate a probability that a crash has occurred at a particular time. The probability may be represented by any predetermined means (e.g., a number between 0 and 1, 1 and 100, a grade such as A-F, etc.).

At block 2024, it is determined whether the new crash prediction is greater than a threshold. In some instances, the threshold may be dynamically selected (at runtime). The sensor measurements and/or the original crash prediction may be used to set the threshold. The threshold may be different for each crash event. For example, if the original crash event indicated a high probability (e.g., 75-100%) that the crash occurred (although the car continued driving), then the threshold may be set to a lower value. As a result, a lower, new crash detection probability will satisfy the threshold and indicate the crash occurred. This allows the system to rely partly on the original crash detection results to determine that a crash has occurred. If the original crash prediction was at a lower probability (e.g., 50-75%), then the threshold may be set higher to be more sensitive to the potential of a false positive. In other instances, the threshold may be predetermined. In those instances, the threshold may be set by a machine-learning model, such as the crash prediction machine-learning model, the user, a command from a remote device, or the like.

In some instances, multiple thresholds may be used. For instance, if the crash prediction is greater than a first threshold, the process may continue to block 2028. If the crash prediction is between a first threshold and a second threshold, the process may continue by first asking a user for confirmation as to whether a crash occurred. If the user confirms the crash, then the process continues to block 2028. If the user does not confirm the crash, then the process continues to block 2012. In some instances, if the user does not reply within a predetermined time interval, a crash may be presume. For example, the crash may have prevented the user from confirming due to injury or damage to the mobile device. As a result, the process may proactively request emergency services or the like. If the crash prediction is lower than the second threshold, then the process may continue to block 2012. The first threshold may be set higher than the second threshold. For example, the first threshold may be set to 85% and the second threshold may be set to 65%. The first threshold and the second threshold may be set to any predetermined (or dynamically selected) values provided that one threshold is higher than the other threshold.

If at block 2024, it is determined that the new crash prediction is greater than the threshold, then the process shifts to block 2028 in which it is indicated that a crash occurred. In some instances, one or more actions may be performed as a result of determining that the crash has occurred such as, but not limited to, automatically transmitting a crash indication to the user of the mobile device (e.g., to start a claims process, determining the safety of the people involved in the crash, gather additional information about the crash, to provide information to the user about what to do after a crash, to provide safety information, to provide First Aid information, etc.), automatically transmitting a crash indication to emergency services, automatically transmitting a crash indication to insurance personnel associated with the vehicle or driver, modifying a driving profile of the driver to include the crash indication and optionally sensor measurements associated with the crash, or the like.

If at block 2024, it is determined that the new crash prediction is not greater than the threshold, then the process continues to block 2012 in which it is indicated that a crash did not occur. In some instances, the crash predictions (e.g., at 2004 and/or at 2020) may be discarded from the system. In other instances, both the crash predictions and the sensor measurements that triggered the crash prediction may be discarded or otherwise marked so as to prevent the use of the sensor measurements in other data analysis. Since the sensor measurements caused at least one false positive crash prediction, the data may include anomalous sensor measurements that may not be reliable even for other analysis operations (e.g., determining driver behavior such as distracted driving or the like). In still yet other instances, the crash prediction may be preserved and further used to train and/or refine the crash prediction machine-learning model (s).

Figure 21:
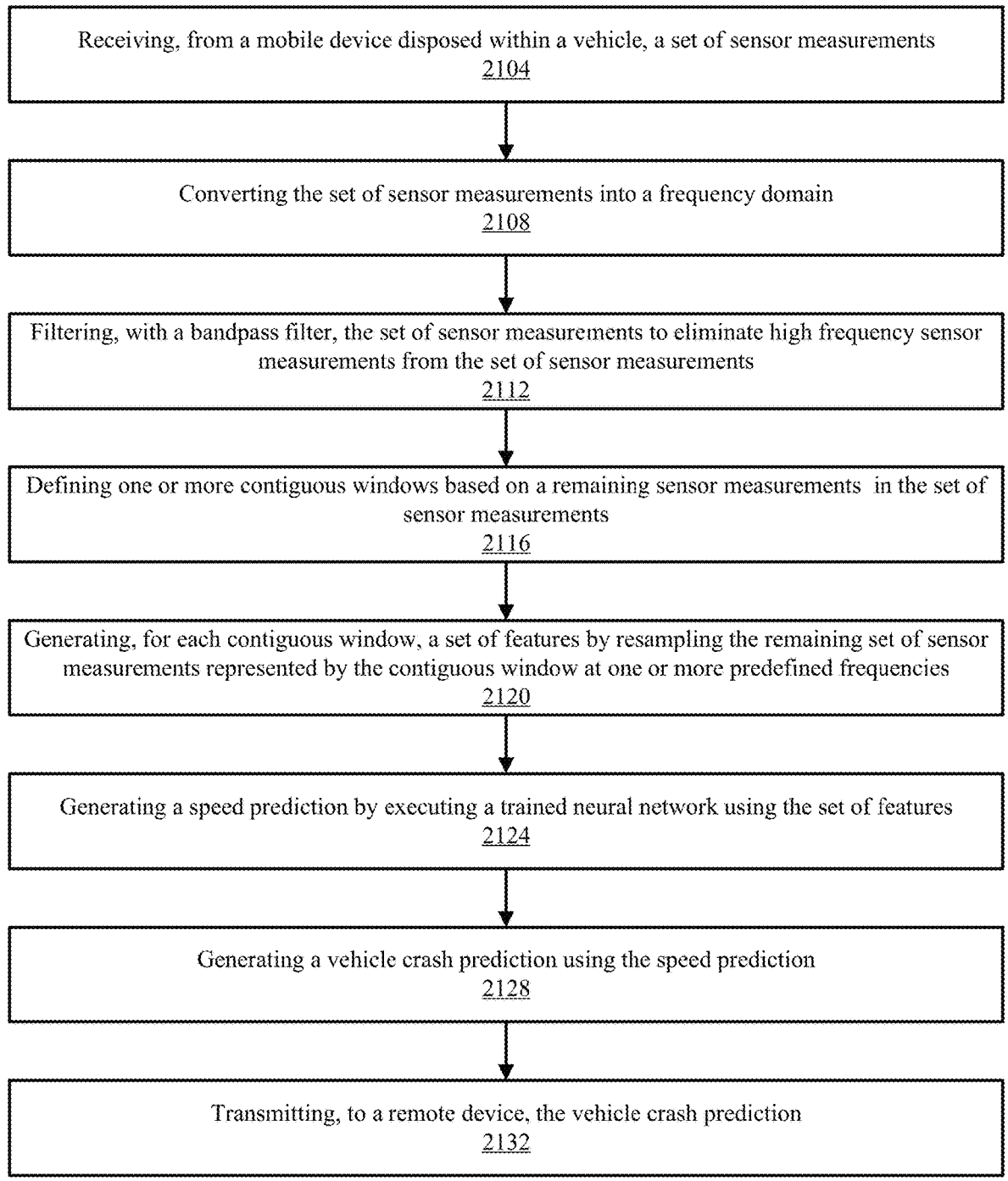
FIG. 21 is a flowchart of example of a process for generating a crash prediction a predicted speed of a vehicle according to some embodiments.

FIG. 21 is a flowchart of example of a process for generating a crash prediction a predicted speed of a vehicle according to some embodiments. The process begins by receiving, from a mobile device disposed within a vehicle, a set of sensor measurements (block 2104). The set of sensor measurements may include measurements received or derived from one or more sensors of the mobile device such as, but not limited to measurements from an accelerometer, activity data (e.g., as described by FIG. 12), measurements from a magnetometer, and/or measurements from one or more other sensors of the mobile device. The sensor measurements may be received over a predetermined time interval or event. For instance, the set of sensor measurements may be received in real time or in regular intervals such as, but not limited to, every half second, one second, five seconds, or any predetermined interval.

Alternatively, the set of sensor measurements may be received (in real time or in regular intervals) over a trip (e.g., where a vehicle is being operated to move from a starting location to a destination location). For example, activity data may be collected from the mobile device as described in connection to FIG. 12 above. The activity data may be used to determine when an activity such as a drive begins and ends. When the mobile device detects that a drive has begun, the mobile device may begin collecting the set of accelerometer measurements from the accelerometer of the mobile device until the activity data (a user, or remote communication), indicates that the drive has terminated.

Alternatively still, the set of sensor measurements may be received from a remote device such as remote accelerometer, a mobile device, a server, or the like. The set of sensor measurements may include sensor measurements collected during the drive. In some instances, the set of sensor measurements may be received after the drive was terminated, upon detection of a crash event, upon detection of another event, upon the expiration of a time interval, when sensor signals exceed a threshold, or the like.

The process continues by converting the set of sensor measurements into a frequency domain (block 2108). The set of sensor measurements may be converted using any means such as a Fourier transform or the like. In some instances, this may performed by a machine-learning model trained to process accelerometer signals. The machine-learning model may be configured to additionally perform one or more of blocks 2112-2120.

The process continues by filtering, with a bandpass filter, the set of sensor measurements to eliminate high frequency sensor measurements from the set of sensor measurements (block 2112). The bandpass filter filters out a portion of the sensor measurements that occur at particular frequencies.

For example, frequencies associated with signal noise sensor measurements that do not correspond to the vehicle (e.g., movement of the mobile device independent from movement of the vehicle). In some instances, frequencies that are greater than a first threshold frequency and less than a second threshold frequency may be filtered. The first threshold may be, for example, approximately 50 Hz and the second threshold may be, for example, approximately 9 Hz. The first and second thresholds may be selected by a process of the mobile device (e.g., such as a data collection application, the operating system, etc.), by a user, from a communication received from a remote device, or the like.

The process continues by defining one or more contiguous windows based on a remaining sensor measurements in the set of sensor measurements (block 2116). Defining one or more contiguous windows from the remaining (filtered) set of sensor measurements may be performed as described by block 1324 of FIG. 13. The contiguous windows may be defined for the time interval over which the accelerometer signals were received. Each accelerometer measurement may correspond to a contiguous window based on time interval represented by a contiguous window and when the accelerometer signal was generated by the accelerometer.

The one or more contiguous windows may be defined by identifying a time difference between each pair of consecutive accelerometer signals (e.g., when the signals were generated by the accelerometer). A continuous window may be defined between a first pair of consecutive sensor measurements that is greater than a threshold (e.g., three standard deviations from the mean time difference between consecutive accelerometer measurements or the like) and the next pair of consecutive sensor measurements that is greater than the threshold. Since the time difference between pairs of consecutive accelerometer measurements varies, the contiguous windows may not be of equal length. Each contiguous window includes a time interval over which a subset of the remaining set of sensor measurements were generated by the accelerometer.

The process continues by generating, for each contiguous window, a set of features by resampling the subset of the remaining set of sensor measurements represented by the contiguous window to one or more predefined frequencies (block 2116). The subset of the remaining set of sensor measurements may be resampled as described by 1328 of FIG. 13, which may be determined, for example, as a frequency of 9-50 Hz, by user input, by a communication from a remote device, or the like.

The process continues by generating, for each set of features, one or more speed predictions by executing a trained neural network using the set of features. The trained neural network may be neural network 1332 of FIG. 13, neural network 1500 of FIG. 15 (e.g., which may the same as neural network 1332), or a different neural network. The neural network may be trained using supervised or unsupervised learning to generate a speed prediction from sensor measurements.

In some instances, the speed predictions may be filtered to prevent reliance on signal noise or accelerometer signals that are not associated with the vehicle from producing inaccurate speed predictions. For example, the one or more speed predictions may be filtered as described by the process of FIG. 17.

The process continues by generating a vehicle crash prediction using the one or more speed predictions (block 2128). Generating a vehicle crash prediction from one or more speed predictions may be performed as described by some or all of the blocks by FIG. 20. For example, a vehicle crash prediction may be provided by a crash-prediction machine-learning model that indicates a crash event occurred. The vehicle crash prediction may be authenticated using the speed prediction to determine whether the vehicle stopped after the crash event. If the vehicle did not stop then the crash prediction may be defined as false (e.g., the crash event did not occur). If the vehicle did stop, then the crash prediction may be defined as true (e.g., the crash event did occur).

For another example, a vehicle crash prediction may be provided by a crash-prediction machine-learning model that indicates a crash event occurred. The vehicle crash prediction may be authenticated using the speed prediction to determine whether the vehicle stopped after the crash event. The speed prediction may be used to derive distance features that indicate if and/or when the vehicle stopped after an initial crash detection. The distance features may be provided to the crash prediction machine-learning model (e.g., the neural network that provided the speed prediction, the same crash prediction machine-learning model that provided the initial crash prediction, or another crash prediction machine-learning model), which may execute using the distance features and (optionally) the sensor measurements to provide a final crash detection to generate a final crash prediction. The final crash prediction may be a probability that a crash occurred (e.g., between 0-1, 0-100, a grade between A-F, a Boolean such as true or false, or the like).

The probability may be compared to one or more thresholds. If the probability is greater than the one or more thresholds, then it may be determined that a crash occurred (e.g., the vehicle crash prediction may be defined as true). If the probability was less than a first threshold, but greater than a second threshold (if utilized), the mobile device may trigger a notification to a user or another device (e.g., such as a server, an onboard computing device of the vehicle, another mobile device, or the like) to request additional information and/or confirmation of whether the crash did or did not occur. The crash event may be defined based on the user input as true (e.g., crash occurred) or false (e.g., crash did not occur). If the probability is less than the one or more thresholds, then it is determined that the crash did not occur (e.g., and the vehicle crash prediction may be defined as false).

The process continues by transmitting, to a remote device, the vehicle crash prediction (and/or final crash prediction) (block 2132).

In some instances, if it is determined that a crash occurred, one or more actions may be executed by the mobile device. Examples of the one or more actions include, but are not limited to, transmitting a notification (e.g., such as a push notification, an email, a robocall, a text message, or the like) to emergency services, initiating a claims process, transmitting a notification to insurance personnel, transmitting a notification to another mobile device (e.g., informing an emergency contact of the driver or passenger, requesting additional information associated with the crash from other occupants of the vehicle or occupants of other vehicles involved in the crash, or the like), determining a severity of the crash, combinations thereof, or the like.

If no crash is predicted, the process may return to block 2104 in which a new set of sensor measurements may be collected. The new set of sensor measurements may be associated with another portion of the same trip or from a subsequent trip.

Figure 22:
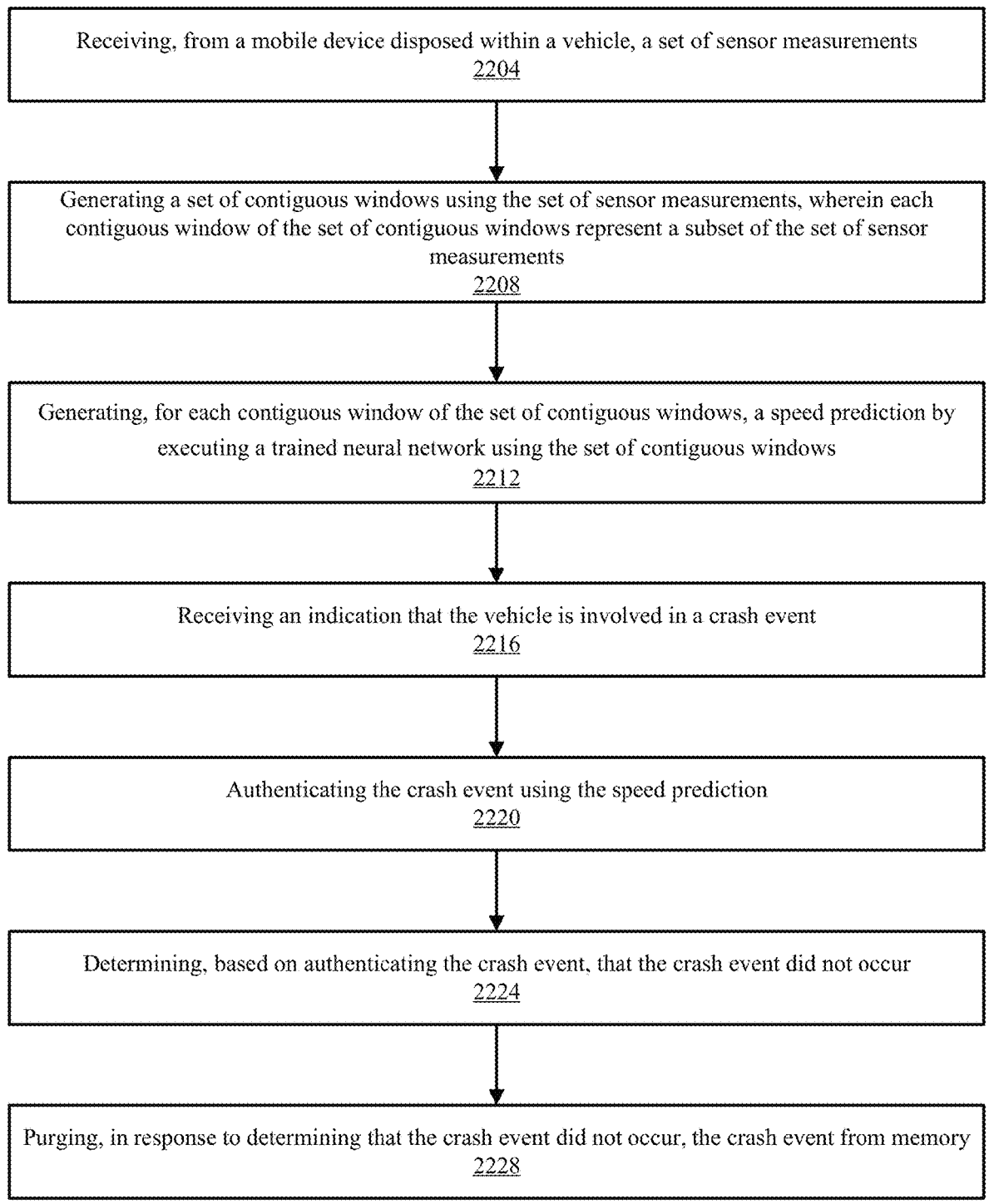
FIG. 22 is a block diagram of a process for authenticating a vehicle crash prediction using speed predictions according to aspects of the present disclosure.

FIG. 22 is a block diagram of a process for authenticating a vehicle crash prediction using speed predictions according to aspects of the present disclosure. The process begins by receiving, from a mobile device disposed within a vehicle, a set of sensor signals (block 2204). The set of sensor measurements received may include measurements received or derived from one or more sensors of the mobile device such as, but not limited to measurements from an accelerometer, activity data (e.g., as described by FIG. 12), measurements from a magnetometer, and/or measurements from one or more other sensors of the mobile device. The sensor measurements may be received over a predetermined time interval or event. For instance, the set of sensor measurements may be received in real time or at regular intervals.

Alternatively, the set of sensor measurements may be received (in real time or at regular intervals) over a trip (e.g., where a vehicle is being operated to move from a starting location to a destination location). For example, activity data may be collected from the mobile device as described in connection to FIG. 12 above. The activity data may be used to determine when an activity such as a drive begins and ends. When the mobile device detects that a drive has begun, the mobile device may begin collecting the set of accelerometer measurements from the accelerometer of the mobile device until the activity data (a user, or remote communication), indicates that the drive has terminated.

Alternatively still, the set of sensor measurements may be received from a remote device such as remote accelerometer, a mobile device, a server, or the like. The set of sensor measurements may include sensor measurements collected during the drive. In some instances, the set of sensor measurements may be received after the drive was terminated, upon detection of a crash event, upon detection of another event, upon the expiration of a time interval, when sensor signals exceed a threshold, or the like.

The process continues by generating a set of contiguous windows using the set of sensor measurements, wherein each contiguous window of the set of contiguous windows represents a subset of the set of sensor measurements (block 2208). Defining one or more contiguous windows from the set of sensor measurements may be performed as described by block 1312 of FIG. 13. The contiguous windows may be defined for the time interval over which the accelerometer signals were received. Each contiguous window may represent a subset of the set of accelerometer measurements that were generated by the accelerometer during a time included in the contiguous window.

The one or more contiguous windows may be defined by identifying a time difference between each pair of consecutive accelerometer signals (e.g., when the signals were generated by the accelerometer). In some instances, the sensor measurements may be processed before the contiguous windows are defined such as filtering (e.g., as described by 1316) and normalizing the remaining sensor measurements (e.g., as described by 1320). A contiguous window may be defined between a first pair of consecutive sensor measurements that is greater than a threshold (e.g., one or more standard deviations from the mean time difference between consecutive sensor measurements or the like) and the next pair of consecutive sensor measurements that is greater than the threshold. Since the time difference between pairs of consecutive accelerometer signal varies, the contiguous windows may of varying lengths. Each contiguous window includes a time interval over which a subset of the remaining set of sensor measurements were generated by or derived from sensor of the mobile device.

The process continues by generating, for each contiguous window of the set of contiguous windows, a speed prediction by executing a trained neural network using the set of contiguous windows (block 2212). One or more features may be derived from each contiguous window. Each feature be an input to the trained neural network. The neural network may be neural network 1332 of FIG. 13 or neural network 1500 of FIG. 15 or the like. The trained neural network may execute using the subset of the set of sensor measurements that corresponds to each contiguous window to generate one or more speed predictions for the contiguous window. Each speed prediction may correspond to a time step (e.g., a particular time within the contiguous window). In some instances, the neural network may generate a set of speed predictions, one speed prediction for each time step of the contiguous window.

The process continues by receiving an indication that the vehicle is involved in a crash event (block 2216). The indication of the crash event may be determined by the mobile device from the sensor measurements. For instance, a crash prediction machine-learning model may execute to generate a crash prediction using the sensor measurements. The crash prediction machine-learning model may be the neural network or a separate model. In some instances, the indication of the crash event may be received from a remote device. For instance, the sensor measurements may be transmitted to a remote device. The remote device may execute the crash prediction machine-learning model to generate a crash prediction. The remote device may then transmit the indication of a crash event back to the mobile device.

The process continues by authenticating the crash event using the speed prediction (block 2220). The crash prediction may be authenticated by one or more of the process described in FIG. 20. In some examples, authenticating the crash event may include determining, using the speed prediction, whether the vehicle continued to drive after the crash event. The mobile device may use multiple time windows (e.g., 30 seconds, 60 seconds, 120, seconds, 180 seconds, 300, seconds, etc.) and determine if and/or when the vehicle stopped with each time window. If the vehicle did not stop, then it may be determined that the indication of the crash event was a false positive (e.g., no crash event occurred).

In other examples, authenticating the crash event can include determining, using the speed prediction, whether the vehicle continued to drive after the crash event. If it was determined that the vehicle stopped after the crash event, distance features may be derived from the speed predictions and the time windows. The distance features may indicate if and/or when the vehicle stopped after an initial crash detection and at what distance from the crash event. The distance features may be provided to the crash prediction machine-learning model (e.g., the neural network that provided the speed prediction, the same crash prediction machine-learning model that provided the initial crash prediction, or another crash prediction machine-learning model), which may execute using the distance features and (optionally) the sensor measurements to generate an updated crash prediction. The updated crash prediction may be a probability that a crash occurred (e.g., between 0-1, 0-100, a grade between A-F, a Boolean such as true or false, or the like).

The probability may be compared to one or more thresholds. If the probability is greater than the one or more thresholds, then it may be determined that a crash event occurred. If the probability was less than an first threshold, but greater than a second threshold (if utilized), the mobile device may trigger a notification to a user or another device (e.g., such as a server, an onboard computing device of the vehicle, another mobile device, or the like) to request additional information and/or confirmation of whether the crash did or did not occur. The crash event may be defined based on the user input as true (e.g., crash occurred) or false (e.g., crash did not occur). If the probability is less than the one or more thresholds, then it is determined that the crash did not occur.

The process continues by determining, based on authenticating the crash event that the crash event did not occur (block 2228).

The process continues by purging, in response to determining that the crash event did not occur, the crash event from memory. In some instance, purging the crash event from memory may include purging the local memory of the mobile device. In other instances, the crash event from memory may include purging memory of one or more remote devices (e.g., other mobile devices, servers) that may be configured to process sensor measurements of the mobile device, provide speed predictions using sensor measurements of the mobile device, provide crash predictions using sensor measurements of the mobile device, or the like.

The processes of blocks 2204-2224 may continue to receive sensor measurements and upon receiving another indication of a possible crash event, authenticate the crash event.

Figure 23:
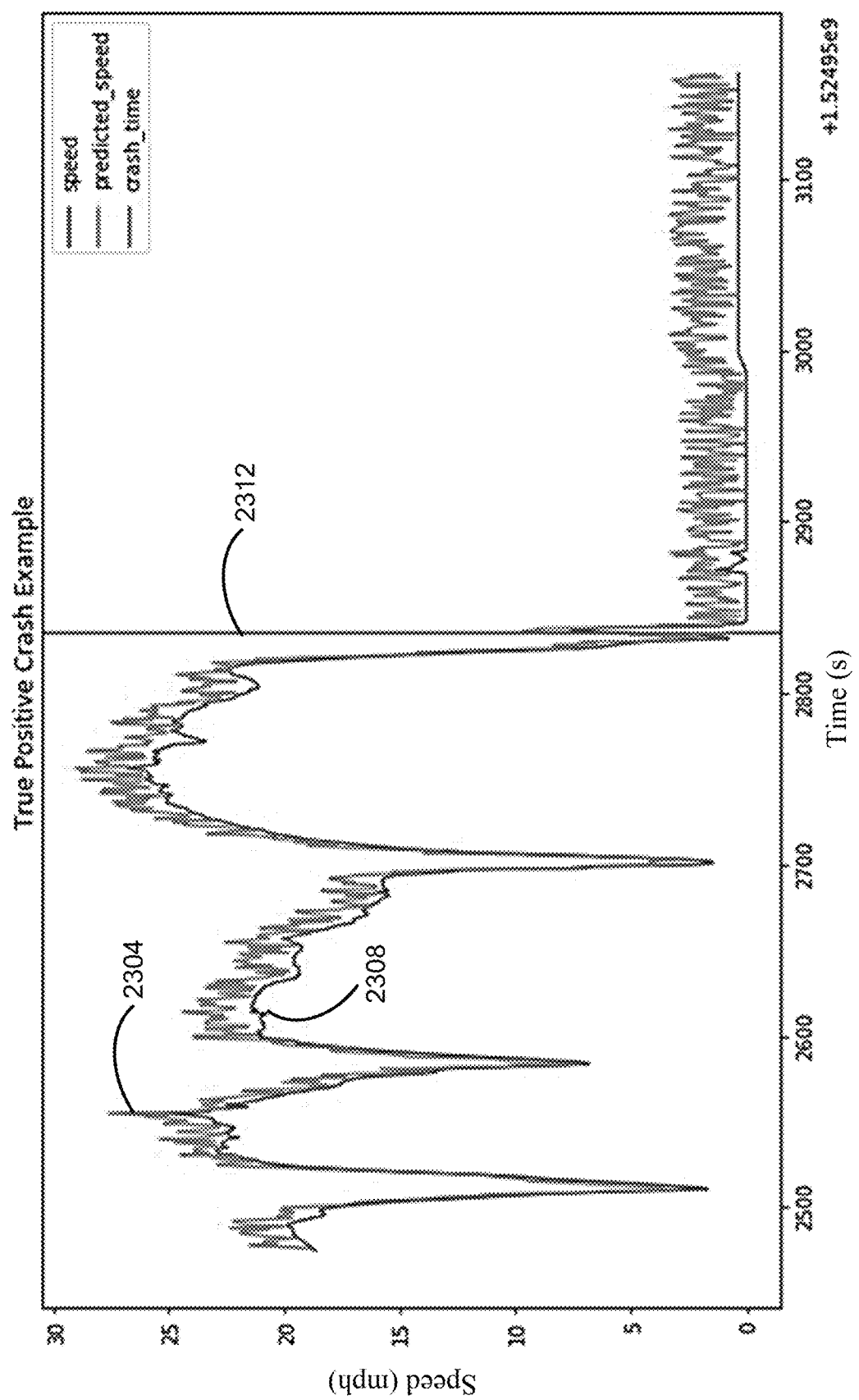
FIG. 23 is an example graph of predicted speed over time representing a true positive crash prediction according to aspects of the present disclosure.

FIG. 23 is an example graph of predicted speed over time representing a true positive crash prediction according to aspects of the present disclosure. Graph 2300 depicts the predicted speed of a vehicle during a drive 2304 (in gray) and the actual speed of the vehicle 2308 (in black). At 2312 (T=2840), a crash prediction indicates the occurrence of a possible crash event. After 2312, the predicted speed of the vehicle (and the actual speed) are reduced to approximately zero indicating the vehicle stopped after the possible crash event. Since the vehicle stopped after the crash event, the possible crash event is more likely to be a true positive (e.g., the crash occurred).

Figure 24:
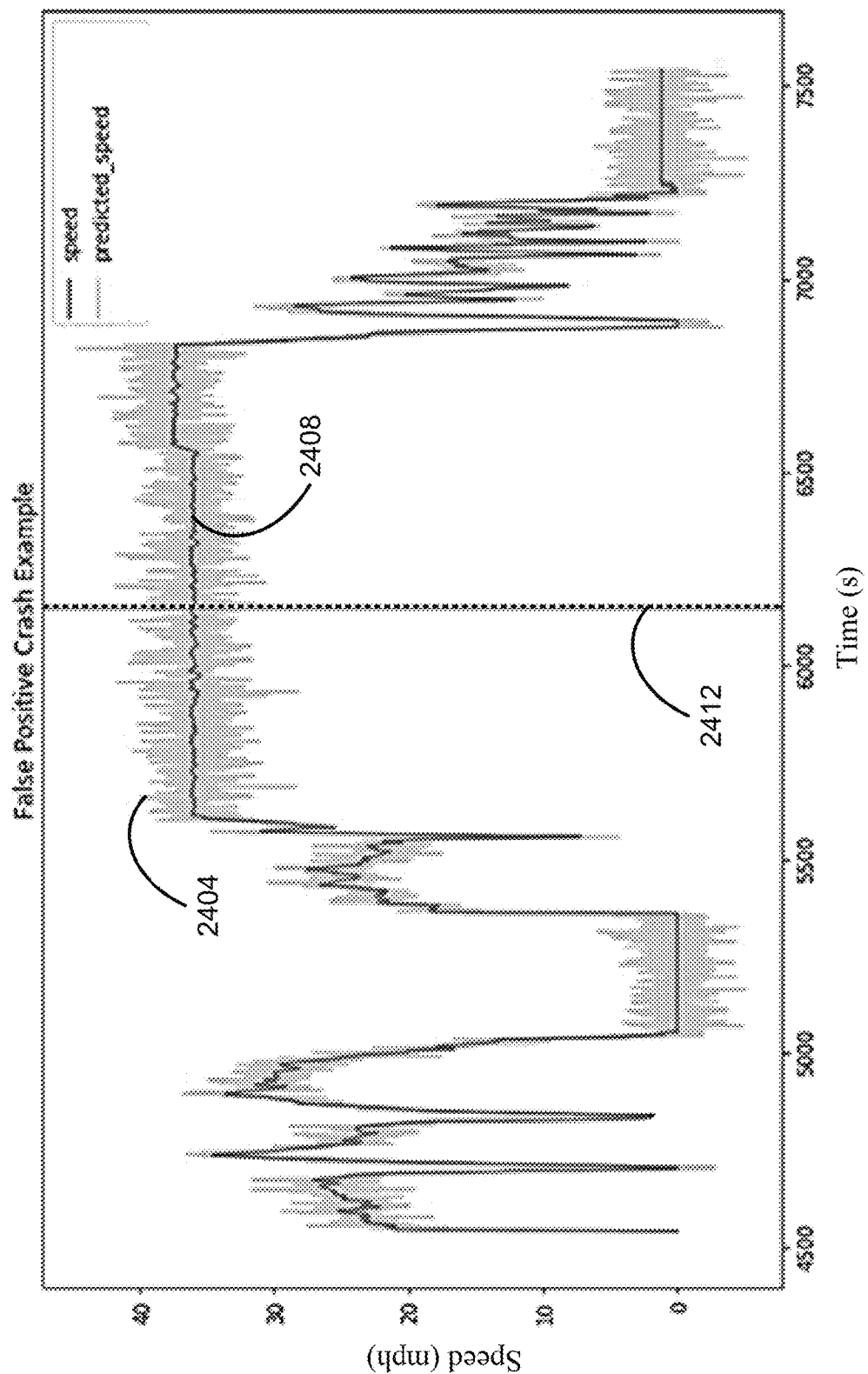
FIG. 24 is an example graph of predicted speed over time representing a false positive crash prediction according to aspects of the present disclosure.

FIG. 24 is an example graph of predicted speed over time representing a false positive crash prediction according to aspects of the present disclosure. Graph 2400 depicts the predicted speed of a vehicle during a drive 2404 (in grey) and the actual speed of the vehicle 2408 (in black). At 2412 (T=6200), the predicted speed of the vehicle is approximately 36 mph when a crash prediction indicates the occurrence of a possible crash event. After 2412, the predicted speed of the vehicle (and the actual speed) does not change, but continues at 36 mph. Since the vehicle did not stop after the crash event, the possible crash event is more likely to be a false positive (e.g., no crash event occurred). As a result, the crash prediction may be purged from local memory.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a non-transitory computer-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory. Memory may be implemented within the processor or external to the processor. As used herein the term "memory" refers to any type of volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices and/or other machine readable mediums for storing information. The term "computer-readable medium" includes, but is not limited to portable or fixed storage devices, optical storage devices, and/or various other storage mediums capable of storing that contain or carry instruction(s) and/or data.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method comprising:
    measuring, by an accelerometer of a mobile phone disposed within a vehicle during a drive, a first set of measurements in a time domain indicating acceleration forces applied to the mobile phone within a first time period of the drive;
    transforming the first set of measurements into a frequency domain;
    executing a digital bandpass filter implemented in hardware or software on the first set of measurements in the frequency domain to produce a second set of the measurements that excludes high frequency measurements from the first set of measurements caused by non-vehicular forces;
    analyzing the second set of the measurements to identify contiguous subsets of measurements in the second set of the measurements;
    resampling each contiguous subset of measurements at one or more predefined frequencies to extract corresponding sets of features for each contiguous subset of measurements; and
    analyzing each set of the features to generate an estimated speed of the vehicle for each contiguous subset of measurements measured within the first time period by the accelerometer of the mobile phone.

2. The method of claim 1, further comprising:
    detecting, based on the first set of measurements, a crash event during the first time period;
    determining, based on the estimated speed, whether the vehicle stopped after the crash event; and
    generating a vehicle crash prediction for the crash event based on the estimated speed and whether the vehicle stopped after the crash event.

3. The method of claim 1, wherein at least two contiguous subsets of measurements in the second set of measurements comprise different quantities of the second set of measurements.

4. The method of claim 1, wherein generating the estimated speed of the vehicle for a contiguous subset of measurements comprises executing a trained neural network using a corresponding set of the features extracted from the contiguous subset of measurements.

5. The method of claim 1, wherein identifying the contiguous subsets of the measurements in the second set of measurements includes:
    deriving, for each acceleration signal in the second set of measurements, a time difference between when each pair of consecutive measurements were collected; and
    identifying a first contiguous subset that includes measurements measured after a first time in which a first time difference between a first pair of consecutive measurements exceeds a threshold and before a second time after which a second time difference between a second pair of consecutive measurements exceeds the threshold, wherein the second time occurs after the first time.

6. The method of claim 5, wherein the threshold is equal to one or more standard deviations from a mean time difference between each pair of consecutive measurements.

7. The method of claim 1, further comprising:
    executing a crash prediction machine-learning model using the first set of measurements to generate a first vehicle crash prediction, the first vehicle crash prediction indicating a crash event occurred at a first time;
    determining, at a time after the first time, that the estimated speed is greater than zero;
    determining, based on determining that the estimated speed of the vehicle is greater than zero, that the crash event did not occur; and
    defining a vehicle crash prediction for the crash event indicating that the crash event was not a vehicle accident.

8. The method of claim 1, further comprising:
    executing a crash prediction machine-learning model using the first set of measurements to generate a first vehicle crash prediction, the first vehicle crash prediction indicating a crash event occurred at a first time;
    determining, at a time after the first vehicle crash prediction, that the vehicle stopped after the first time;
    generating, using the estimated speed, a set of distance features, each distance feature of the set of distance features corresponding to a position of the vehicle relative to the crash event; and
    performing a second execution of the crash prediction machine-learning model using the first set of measurements and the set of distance features to define a vehicle crash prediction for the crash event.

9. The method of claim 1, further comprising determining, from the first set of measurements, activity data indicative of an activity associated with the mobile phone.

10. A method comprising:
    measuring, by an accelerometer of a mobile phone disposed within a vehicle during a drive, a first set of measurements in a time domain indicating acceleration forces applied to the mobile phone within a first time period of the drive;
    transforming the first set of measurements into a frequency domain;
    executing a digital bandpass filter implemented in hardware or software on the first set of measurements in the frequency domain to produce a second set of measurements that excludes high frequency measurements from the first set of measurements caused by non-vehicular forces;
    analyzing the second set of measurements to identify contiguous subsets of measurements in the second set of measurements;
    analyzing each contiguous subset of measurements in the second set of measurements to generate an estimated speed of the vehicle for each contiguous subset of measurements measured within the first time period by the accelerometer of the mobile phone;
    receiving an indication that the vehicle is involved in a crash event; and
    authenticating the crash event using the estimated speed.

11. The method of claim 10, wherein at least two contiguous subsets of measurements in the second set of measurements comprise different quantities of the second set of measurements.

12. The method of claim 10, wherein generating the estimated speed of the vehicle for a contiguous subset of measurements comprises executing a trained neural network using measurements in the contiguous subset of measurements.

13. The method of claim 10, wherein authenticating the crash event using the estimated speed includes:
determining whether the vehicle stopped after the crash event, wherein in response to determining that the vehicle did not stop after the crash event, the crash event is determined not to be a vehicle accident.

14. The method of claim 10, wherein authenticating the crash event using the estimated speed includes:
determining that the vehicle stopped at a distance from the crash event;
generating one or more distance features that represent the distance from the crash event;
executing a crash prediction machine-learning model using the first set of measurements and the distance features to generate a vehicle crash prediction; and
determining that the vehicle crash prediction is greater than a threshold, wherein determining that the vehicle crash prediction is greater than the threshold indicates that the crash event was a vehicle accident.

15. A mobile device comprising:
one or more processors;
an accelerometer; and
a non-transitory computer-readable medium storing instructions, that when executed by the one or more processors, cause the one or more processors to perform operations including:
measuring, by the accelerometer, and while the mobile device is disposed within a vehicle during a drive, a first set of measurements in a time domain indicating acceleration forces applied to the mobile device within a first time period of the drive;
transforming the first set of measurements into a frequency domain;
executing a digital bandpass filter implemented in hardware or software on the first set of measurements in the frequency domain to produce a second set of measurements that excludes high frequency measurements from the first set of measurements caused by non-vehicular forces;
analyzing the second set of measurements to identify contiguous subsets of measurements in the second set of measurements;
resampling each contiguous subset of measurements at one or more predefined frequencies to extract corresponding sets of features for each contiguous subset of measurements; and
analyzing each set of the features to generate an estimated speed of the vehicle for each contiguous subset of measurements measured within the first time period by the accelerometer of the mobile device.

16. The mobile device of claim 15, wherein at least two contiguous subsets of measurements in the second set of measurements comprise different quantities of the second set of measurements.

17. The mobile device of claim 15, wherein generating the estimated speed of the vehicle for a contiguous subset of measurements comprises executing a trained neural network using a corresponding set of the features extracted from the contiguous subset of measurements.

18. The mobile device of claim 15, wherein identifying the contiguous subsets of the measurements in the second set of measurements includes:
deriving, for each acceleration signal in the second set of measurements, a time difference between when each pair of consecutive measurements were collected; and
identifying a first contiguous subset that includes measurements measured after a first time in which a first time difference between a first pair of consecutive measurements exceeds a threshold and before a second time after which a second time difference between a second pair of consecutive measurements exceeds the threshold, wherein the second time occurs after the first time.

19. The mobile device of claim 15, further comprising:
executing a crash prediction machine-learning model using the first set of measurements to generate a first vehicle crash prediction, the first vehicle crash prediction indicating a crash event occurred at a first time;
determining, at a time after the first time, that the estimated speed is greater than zero;
determining, based on determining that the estimated speed of the vehicle is greater than zero, that the crash event did not occur; and
defining a vehicle crash prediction for the crash event indicating that the crash event was not a vehicle accident.

20. The mobile device of claim 15, further comprising:
executing a crash prediction machine-learning model using the first set of measurements to generate a first vehicle crash prediction, the first vehicle crash prediction indicating a crash event occurred at a first time;
determining, at a time after the first vehicle crash prediction, that the vehicle stopped after the first time;
generating, using the estimated speed, a set of distance features, each distance feature of the set of distance features corresponding to a position of the vehicle relative to the crash event; and
performing a second execution of the crash prediction machine-learning model using the first set of measurements and the set of distance features to define a vehicle crash prediction for the crash event.

* * * * *